US012656514B2

(12) United States Patent
Camargo et al.

(10) Patent No.: US 12,656,514 B2
(45) Date of Patent: Jun. 16, 2026

(54) DETERMINATION OF IN-SITU STRESS PERTURBATION USING POTENTIAL FIELDS DATA

(71) Applicant: Saudi Arabian Oil Company, Dhahran (SA)

(72) Inventors: Otto Meza Camargo, Dhahran (SA); Karla Olvera Carranza, Dhahran (SA); Dumitru Ion, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 422 days.

(21) Appl. No.: 18/510,152

(22) Filed: Nov. 15, 2023

(65) Prior Publication Data

US 2025/0155595 A1 May 15, 2025

(51) Int. Cl.
*G01V 1/28* (2006.01)
*G01V 1/30* (2006.01)

(52) U.S. Cl.
CPC .............. *G01V 1/282* (2013.01); *G01V 1/301* (2013.01); *G01V 1/306* (2013.01); *G01V 2210/614* (2013.01); *G01V 2210/6165* (2013.01); *G01V 2210/66* (2013.01)

(58) Field of Classification Search
CPC ..... E21B 2200/20; E21B 49/00; G01V 1/282; G01V 1/301; G01V 1/306; G01V 11/00; G01V 2210/614; G01V 2210/6165; G01V 2210/66; G01V 3/26; G01V 7/00
See application file for complete search history.

(56) References Cited

U.S. PATENT DOCUMENTS 5,390,114 A * 2/1995 Chapin ................... G01V 7/00
73/382 R
6,035,255 A * 3/2000 Murphy ................. G01V 11/00
702/11
(Continued)

FOREIGN PATENT DOCUMENTS

AU    2013374225 B2    7/2014
AU    2018267575 B9    12/2018
(Continued)

OTHER PUBLICATIONS

Ge, Jun et al.; "Semianalytical modeling on 3D stress redistribution during hydraulic fracturing stimulation and its effects on natural fracture reactivation" Int J Numer Anal Methods Geomech. (2020) / V. 44, / 8; pp. 1184-1199.
(Continued)

*Primary Examiner* — Thien M Le
(74) *Attorney, Agent, or Firm* — Bracewell LLP; Constance G. Rhebergen; Brian H. Tompkins

(57) ABSTRACT

Determination of an in-situ stress perturbation model for a subsurface geological structure by using potential fields data. Potential fields data, such as gravity data, may be obtained and attributes may be determined from the gravity data. Lineaments that define the structural framework of the basement may be derived from an interpretation of the attributes. The lineaments may be combined with an in-situ stress direction and used as constraints in a finite element geomechanical simulation to generate the in-situ stress perturbation model.

24 Claims, 18 Drawing Sheets
(14 of 18 Drawing Sheet(s) Filed in Color)

(56) References Cited

U.S. PATENT DOCUMENTS

| | | | |
|---|---|---|---|
| 6,044,328 A * | 3/2000 | Murphy | G01V 11/00 |
| | | | 702/11 |
| 6,070,125 A * | 5/2000 | Murphy | G01V 11/00 |
| | | | 702/11 |
| 6,502,037 B1 | 12/2002 | Jorgensen et al. | |
| 6,705,398 B2 | 3/2004 | Weng | |
| 6,904,365 B2 | 6/2005 | Bratton et al. | |
| 7,025,138 B2 | 4/2006 | Kurkjian et al. | |
| 7,042,802 B2 | 5/2006 | Sinha | |
| 7,337,660 B2 | 3/2008 | Ibrahim et al. | |
| 7,457,194 B2 | 11/2008 | Prioul et al. | |
| 7,526,385 B2 | 4/2009 | Sayers | |
| 7,562,278 B2 | 7/2009 | Lyakh et al. | |
| 7,565,278 B2 | 7/2009 | Li et al. | |
| 7,679,993 B2 | 3/2010 | Sayers | |
| 7,707,018 B2 | 4/2010 | Shaw | |
| 7,941,307 B2 | 5/2011 | Symington et al. | |
| 8,010,294 B2 | 8/2011 | Dorn et al. | |
| 8,024,124 B2 | 9/2011 | Sayers | |
| 8,041,510 B2 | 10/2011 | Dasgupta | |
| 8,078,405 B2 | 12/2011 | Delorme | |
| 8,121,792 B2 | 2/2012 | Hsu et al. | |
| 8,204,727 B2 | 6/2012 | Dean et al. | |
| 8,301,427 B2 | 10/2012 | Souche et al. | |
| 8,363,509 B2 * | 1/2013 | Colombo | G01V 11/00 |
| | | | 367/73 |
| 8,374,836 B2 | 2/2013 | Yogeswaren | |
| 8,498,848 B2 | 7/2013 | Habashy et al. | |
| 8,619,500 B2 | 12/2013 | Gray | |
| 8,756,016 B2 | 6/2014 | Tabanou et al. | |
| 8,780,671 B2 | 7/2014 | Sayers | |
| 8,898,046 B2 | 11/2014 | Moos et al. | |
| 9,022,140 B2 | 5/2015 | Marx et al. | |
| 9,062,545 B2 | 6/2015 | Roberts et al. | |
| 9,063,251 B2 | 6/2015 | Moos | |
| 9,068,448 B2 | 6/2015 | Hui et al. | |
| 9,110,190 B2 | 8/2015 | Yogeswaren | |
| 9,152,745 B2 | 10/2015 | Glinsky | |
| 9,305,121 B2 | 4/2016 | Yao et al. | |
| 9,390,204 B2 | 7/2016 | Bowen et al. | |
| 9,417,348 B2 | 8/2016 | Lin | |
| 9,435,192 B2 | 9/2016 | Lawrence et al. | |
| 9,465,140 B2 | 10/2016 | Crawford et al. | |
| 9,618,652 B2 | 4/2017 | Weng et al. | |
| 9,677,393 B2 | 6/2017 | Morris | |
| 9,846,260 B2 | 12/2017 | Mallet | |
| 9,988,895 B2 | 6/2018 | Roussel et al. | |
| 10,001,003 B2 | 6/2018 | Dusseault et al. | |
| 10,101,498 B2 | 10/2018 | Berard et al. | |
| 10,190,406 B2 | 1/2019 | Holland et al. | |
| 10,302,785 B2 | 5/2019 | Dirksen et al. | |
| 10,310,137 B1 | 6/2019 | Mallet | |
| 10,352,145 B2 | 7/2019 | Maxwell et al. | |
| 10,422,208 B2 | 9/2019 | Weng et al. | |
| 10,465,509 B2 | 11/2019 | Yao et al. | |
| 10,528,681 B2 | 1/2020 | Yogeswaren | |
| 10,563,493 B2 | 2/2020 | Ganguly et al. | |
| 10,571,605 B2 | 2/2020 | Crawford et al. | |
| 10,572,611 B2 | 2/2020 | Huang et al. | |
| 10,607,043 B2 | 3/2020 | Camargo et al. | |
| 10,724,346 B2 | 7/2020 | Eftekhari Far et al. | |
| 10,760,416 B2 | 9/2020 | Weng et al. | |
| 10,787,887 B2 | 9/2020 | Pankaj et al. | |
| 10,846,447 B2 | 11/2020 | Myers et al. | |
| 10,853,533 B2 | 12/2020 | Plateaux et al. | |
| 10,920,538 B2 | 2/2021 | Rodriguez Herrera et al. | |
| 10,920,552 B2 | 2/2021 | Rodriguez Herrera et al. | |
| 11,098,582 B1 | 8/2021 | Camargo et al. | |
| 11,180,975 B2 | 11/2021 | Renaudeau et al. | |
| 11,313,994 B2 | 4/2022 | Salman et al. | |
| 11,434,759 B2 | 9/2022 | Awan et al. | |
| 11,599,790 B2 | 3/2023 | Pandey et al. | |
| 2006/0036367 A1 * | 2/2006 | Brewster | G01V 11/00 |
| | | | 702/14 |
| 2007/0100594 A1 | 5/2007 | Lamoureux-Var et al. | |

| | | | |
|---|---|---|---|
| 2007/0255545 A1 | 11/2007 | Pita et al. | |
| 2007/0272407 A1 | 11/2007 | Lehnman et al. | |
| 2008/0071505 A1 | 3/2008 | Huang et al. | |
| 2009/0248374 A1 | 10/2009 | Huang et al. | |
| 2009/0319243 A1 | 12/2009 | Suarez-Rivera et al. | |
| 2010/0191470 A1 | 7/2010 | Tabanou et al. | |
| 2010/0250216 A1 | 9/2010 | Narr et al. | |
| 2011/0163733 A1 * | 7/2011 | Nelson, Jr. | G01V 3/082 |
| | | | 324/72 |
| 2012/0072188 A1 | 3/2012 | Maerten et al. | |
| 2013/0046524 A1 | 2/2013 | Gathogo et al. | |
| 2013/0297269 A1 | 11/2013 | Davies et al. | |
| 2013/0299241 A1 | 11/2013 | Alberty et al. | |
| 2013/0312974 A1 | 11/2013 | Mcclung, IV | |
| 2014/0052375 A1 * | 2/2014 | Brewster | G01V 7/00 |
| | | | 702/2 |
| 2014/0358510 A1 | 12/2014 | Sarkar et al. | |
| 2015/0129211 A1 | 5/2015 | Dusseault et al. | |
| 2015/0276979 A1 | 10/2015 | Hugot et al. | |
| 2015/0315485 A1 | 11/2015 | Morris | |
| 2016/0222765 A1 | 8/2016 | Nooruddin et al. | |
| 2016/0245939 A1 | 8/2016 | Williams | |
| 2016/0266274 A1 | 9/2016 | Alqam et al. | |
| 2016/0266278 A1 | 9/2016 | Holderby et al. | |
| 2016/0281498 A1 | 9/2016 | Nguyen et al. | |
| 2016/0313443 A1 * | 10/2016 | Al-Shuhail | G01S 7/41 |
| 2017/0051598 A1 | 2/2017 | Ouenes | |
| 2017/0132339 A1 | 5/2017 | Umholtz et al. | |
| 2017/0145793 A1 | 5/2017 | Ouenes | |
| 2017/0176228 A1 | 6/2017 | Elisabeth | |
| 2017/0205531 A1 | 7/2017 | Berard et al. | |
| 2017/0254909 A1 | 9/2017 | Agharazi | |
| 2017/0316128 A1 | 11/2017 | Huang et al. | |
| 2018/0203146 A1 | 7/2018 | Den Boer et al. | |
| 2019/0080122 A1 | 3/2019 | Camargo et al. | |
| 2019/0345815 A1 | 11/2019 | Mishra | |
| 2020/0056460 A1 | 2/2020 | Isaev et al. | |
| 2020/0095858 A1 | 3/2020 | Bouaouaja et al. | |
| 2020/0141215 A1 | 5/2020 | Crews et al. | |
| 2020/0225382 A1 | 7/2020 | Mallet et al. | |
| 2020/0225383 A1 | 7/2020 | Mallet et al. | |
| 2020/0326322 A1 | 10/2020 | Farrukh Hamza | |
| 2021/0054736 A1 | 2/2021 | Moos et al. | |
| 2021/0102461 A1 | 4/2021 | Kumar et al. | |
| 2021/0132246 A1 | 5/2021 | Liu et al. | |
| 2021/0140313 A1 | 5/2021 | Busetti | |
| 2021/0156248 A1 | 5/2021 | Mahmood et al. | |
| 2021/0222518 A1 | 7/2021 | Bardy et al. | |
| 2021/0350052 A1 | 11/2021 | Alwahtani et al. | |
| 2022/0018245 A1 | 1/2022 | Coenen | |
| 2022/0291418 A1 | 9/2022 | Noufal | |
| 2023/0012429 A1 | 1/2023 | Camargo et al. | |
| 2023/0084141 A1 | 3/2023 | Camargo et al. | |
| 2023/0333278 A1 | 10/2023 | Camargo et al. | |
| 2024/0418903 A1 * | 12/2024 | Muzaffar | G01V 7/04 |

FOREIGN PATENT DOCUMENTS

| | | | |
|---|---|---|---|
| BR | PI1003737 A2 | 3/2012 | |
| CA | 2778313 A1 | 6/2011 | |
| CA | 2904008 A1 | 9/2014 | |
| CA | 2932670 A1 | 12/2017 | |
| CA | 3043231 A1 | 6/2018 | |
| CN | 102042010 B | 1/2014 | |
| CN | 102788994 B | 1/2015 | |
| CN | 104459775 B | 3/2015 | |
| CN | 104500050 A | 5/2015 | |
| CN | 105403929 A | 3/2016 | |
| CN | 105484741 A | 4/2016 | |
| CN | 103064114 B | 5/2016 | |
| CN | 106285659 A | 1/2017 | |
| CN | 104992468 B | 1/2018 | |
| CN | 105134156 B | 5/2018 | |
| CN | 108331555 A | 7/2018 | |
| CN | 107578343 B | 7/2020 | |
| CN | 107577831 B | 8/2020 | |
| CN | 110850057 B | 4/2021 | |
| CN | 112253103 B | 8/2021 | |
| CN | 112065351 B | 9/2021 | |

(56) References Cited

FOREIGN PATENT DOCUMENTS

| CN | 113534291 A | 10/2021 |
|----|-------------|---------|
| CN | 109102180 B | 11/2021 |
| CN | 112526107 B | 11/2021 |
| CN | 109388817 B | 2/2022 |
| CN | 114153002 A | 3/2022 |
| CN | 115166853 A | 10/2022 |
| CN | 115618274 A | 1/2023 |
| EP | 3118758 A1 | 1/2017 |
| EP | 2179134 B1 | 1/2018 |
| EP | 3074957 B1 | 2/2022 |
| EP | 4042211 | 8/2022 |
| FR | 2979016 A | 2/2013 |
| KR | 101620506 B1 | 5/2016 |
| KR | 102111207 B1 | 5/2020 |
| RU | 2404359 C2 | 11/2010 |
| WO | 2010111398 A2 | 9/2010 |
| WO | 2013169256 A1 | 11/2013 |
| WO | 2015168417 A1 | 11/2015 |
| WO | 2016122792 A1 | 8/2016 |
| WO | 2016209822 A1 | 12/2016 |
| WO | 2017019388 A1 | 2/2017 |
| WO | 2017216594 A1 | 12/2017 |
| WO | 2019238451 A1 | 12/2019 |
| WO | 2020167282 A1 | 8/2020 |
| WO | 2020198210 A1 | 10/2020 |
| WO | 2021108439 A1 | 6/2021 |
| WO | 2021236877 A1 | 11/2021 |
| WO | 2023130074 A1 | 7/2023 |
| WO | 2024003599 A1 | 1/2024 |

OTHER PUBLICATIONS

Huang, Jian et al.; "Natural-hydraulic fracture interaction: Microseismic observations and geomechanical predictions" (abstract only) Interpretation (2015) 3 (3); pp. SU17-SU31.

Kayode, B. et al.; "Advances in Reservoir Modeling: A New Approach for Building Robust Reservoir Models" (abstract only) SPE-187993-MS, SPE KSA Annual Technical Symposium and Exhibition, Dammam, Saudi Arabia, Apr. 2017; pp. 1-6.

Meng, Fanle et al.; "Numerical Simulation of Fracture Flow Interaction Based on Discrete Fracture Model" Processes (2023), 11, 3013; pp. 1-19.

Meza, O. et al.; "Integration of Borehole Image Logs and Rock Mechanics for Critically Stressed Fractures Analysis in Weak Carbonates" (abstract only) 2nd EAGE Borehole Geology Workshop, Oct. 2017, vol. 2017; pp. 1-5.

Ochie, Karen Ifeoma et al.; "Geostatistics—Kriging and Co-Kriging Methods in Reservoir Characterization of Hydrocarbon Rock Deposits" SPE-193483-MS, Nigeria Annual International Conference & Exhibition, Lagos, Nigeria, Aug. 6-8, 2018; pp. 1-11.

Zeng, Qingdong et al.; "Numerical Simulation of Fluid-Solid Coupling in Fractured Porous Media with Discrete Fracture Model and Extended Finite Element Method" Computation (2015), 3; pp. 541-557.

Mojeddifar, Saeed et al.; "Porosity prediction from seismic inversion of a similarity attribute based on a pseudo-forward equation (PFE): a case study from the North Sea Basin, Netherlands" Pet. Sci. (2015) 12; pp. 428-442.

Nejadi, Siavash et al.; "History matching and uncertainty quantification of discrete fracture network models in fractured reservoirs" Journal of Petroleum Science and Engineering 152 (2017); pp. 21-32.

Nolte, K.G. et al.; "After-Closure Analysis of Fracture Calibration Tests" SPE 38676, 1997 SPE Annual Technical Conference and Exhibition, San Antonio, TX, Oct. 5-8, 1997; pp. 333-349.

Nvidia; "XGBoost—What Is It and Why Does it Matter?" available as of Aug. 3, 2023 at: https://www.nvidia.com/en-us/glossary/data-science/xgboost/; pp. 1-7.

Orr, Wilson L.; "Changes in Sulfur Content and Isotopic Ratios of Sulfur during Petroleum Maturation—Study of Big Horn Basin Paleozoic Oils" The American Association of Petroleum Geologists Bulletin, V. 58, No. 11 (Nov. 1974); pp. 2295-2318.

Ouenes, Ahmed; "Stress Modeling '3-G' Workflow Pinpoints Shale Sweet Spots" The American Oil & Gas Reporter, Jul. 2015; pp. 1-3.

Phillips, Jeffrey D. et al.; "Sources of Magnetic Anomalies over a Sedimentary Basin: Preliminary Results from the Coastal Plain of the Arctic National Wildlife Refuge, Alaska*" Geologic Apps of Gravity and Magnetics: Case Histories, 1998; pp. 130-134.

Phillips, Jeffrey D.; "Designing matched bandpass and azimuthal filters for the separation of potential-field anomalies by source region and source type" ASEG 15th Geophysical Conference and Exhibition, Aug. 2001, Brisbane; pp. 1-4.

Rezmer-Cooper, Iain M. et al.; "Real-Time Formation Integrity Tests Using Downhole Data" IADC/SPE 59123, 2000 IASC/SPE Drilling Conference, New Orleans, LA, Feb. 23-25, 2000; pp. 1-12.

Rogers S. et al, "Integrating discrete fracture network models and pressure transient data for testing conceptual fracture models of the Valhall chalk reservoir, Norway North Sea"; Geological Society, London, Special Publications, 270, 2007, pp. 187-197.

Rogers, Stephen F.; "Critical stress-related permeability in fractured rocks", Chpt 2, Fracture and In-Situ Stress Characterization of Hydrocarbon Reservoirs, (AMEEN) Geoscience World, The Geological Society of London, Jan. 1, 2003; pp. 7-16.

Schlumberger; "Welcome to Techlog online help Feb. 2018" 2018; pp. 1-2.

Schultz, Ryan et al.; "The Cardston Earthquake Swarm and Hydraulic Fracturing of the Exshaw Formation (Alberta Bakken Play)" Bulletin of the Seismological Society of America, vol. 105, No. 6, Dec. 2015; pp. 1-14.

Silverman, B.W.; "Density Estimation For Statistics and Data Analysis" Monographs on Statistics and Applied Probability, London: Chapman and Hall, 1986; pp. 1-22.

Sorkhabi, Rasoul, Ph.D.; "Locating Sweet Spots: Shale Petroleum Systems" available as of Dec. 28, 2021 at: https://www.geoexpro.com/articles/2020/06/locating-sweet-spots-shale-petroleum-systems; vol. 17, No. 2—2020; pp. 1-10.

Spector, A. et al.; "Statistical Models for Interpreting Aeromagnetic Data" Geophysics, vol. 35, No. 2, Apr. 1970; pp. 293-302.

Tian, Fei et al.; "Three-Dimensional Geophysical Characterization of Deeply Buried Paleokarst System in the Tahe Oilfield, Tarim Basin, China" Water (2019) 11, 1045; pp. 1-18.

Tokhmchi, Behzad et al.; "Estimation of the fracture density in fractured zones using petrophysical logs" Journal of Petroleum Science and Engineering 72 (2010); pp. 206-213.

U.S. Appl. No. 16/792,742 titled "Determination of Calibrated Minimum Horizontal Stress Magnitude Using Fracture Closure Pressure and Multiple Mechanical Earth Model Realizations" filed Sep. 17, 2021.

U.S. Appl. No. 17/463,153 titled "Determining Hydrogen Sulfide (H2S) Concentration and Distribution in Carbonate Reservoirs Using Geomechanical Properties" filed Aug. 31, 2021.

U.S. Appl. No. 17/476,914 titled "Identifying Fluid Flow Paths in Naturally Fractured Reservoirs" filed Sep. 16, 2021.

U.S. Appl. No. 17/690,484 titled "Geo-Mechanical Based Determination of Sweet Spot Intervals for Hydraulic Fracturing Stimulation" filed Mar. 9, 2022.

U.S. Appl. No. 17/712,820 titled "System and Method to Develop Naturally Fractured Hydrocarbon Reservoirs Using a Fracture Density Index" filed Apr. 4, 2022.

U.S. Appl. No. 17/721,064 titled "Identifying Naturally Fractured Sweet Spots Using a Fracture Density Index (FDI)" filed Apr. 14, 2022.

Van Lanen, Xavier et al.; "Integrated geologic and geophysical studies of North American continental intraplate seismicity" The Geological Society of America, Special Paper 425, 2007; pp. 101-112.

Wikipedia; "Kernel density estimation" available as of Apr. 4, 2022 at: https://en.wikipedia.org/wiki/Kernel_density_estimation#:~:text= In statistics%2C kernel density estimation,on a finite data sample; pp. 1-12.

Wilson, Adam; "Common Mistakes Associated with Diagnostic Fracture Injection Tests" Journal of Petroleum Technology, Aug. 31, 2014; pp. 1-6.

(56)        References Cited

OTHER PUBLICATIONS

Worden, R.H. et al.; "Gas Souring by Thermochemical Sulfate Reduction by 140C1" The American Association of Petroleum Geologists Bulletin, V. 79, No. 6 (Jun. 1995); pp. 854-863.

Worden, Richard H. et al.; "Origin of H2S in Khuff Reservoirs by Thermochemical Sulfate Reduction: Evidence from Fluid Inclusions" Saudi Aramco Journal of Technology, Fall 2004; pp. 42-52.

Wynants-Morel, Nicolas et al.; "Stress Perturbation From Aseismic Slip Drives the Seismic Front During Fluid Injection in a Permeable Fault" JGR Solid Earth vol. 125, Issue 7, Jul. 2020; pp. 1-23.

XGBoost Tutorials; "Introduction to Boosted Trees" available as of Aug. 3, 2023 at: https://xgboost.readthedocs.io/en/stable/tutorials/model.html; pp. 1-10.

Zellou, Abdel et al.; "Fractured Reservoir Characterization Using Post-Stack Seismic Attributes: Application to a Hungarian Reservoir", EAGE 68th Conference & Exhibition—Vienna, Austria, Jun. 12-15, 2006; pp. 1-4.

Zhu, GuangYou et al.; "The controlling factors and distribution prediction of H2S formation in marine carbonate gas reservoir, China" (abstract only) Chinese Science Bulletin, vol. 52 (2007), pp. 150-163.

Zoback, Mark D.; "Chapter 11: Critically stressed faults and fluid flow" Reservoir Geomechanics, Cambridge University Press, New York, 2007, pp. 1-21.

Ahmadi, Mohammad Ali; "Toward Reliable Model for Prediction Drilling Fluid Density at Wellbore Conditions: A LSSVM Model" Department of Petroleum Engineering, Ahwaz Faculty of Petroleum Engineering; pp. 1-34.

Akhmetova, A.A. et al.; "Evaluation of the applicability minifracturing data to determine reservoir pressure and transmissibility (Russian)." OIJ 2018 (2018); pp. 90-94.

Aksenov, A.A. et al.; "Prediction of Distribution of Hydrogen Sulfide in Oil-Gas Basins" Petroleum Geology: A digest of Russian literature on Petroleum Geology; vol. 16 (1979), No. 10 (October); pp. 439-441.

Ai-Hawas, Khalid et al.; Delineation of fracture anisotropy signatures in Wudayhi Field by azimuthal seismic data; The Leading Edge, Interpreter's Corner, Dec. 2003; pp. 1202-1211.

Al-Nutaifi et al.; "Wellbore Instability Analysis for Highly Fractured Carbonate Gas Reservoir from Geomechanics Prospective, Saudi Arabia Case Study" International Petroleum Technology Conference, Kuala Lumpur, Malaysia, Dec. 10-12, 2014; pp. 1-10.

Alcantara, Ricardo et al.; "A Dynamic Characterization Approach for a Complex Naturally Fractured Reservoir" International Petroleum Technology Conference, Beijing, China, Mar. 26-28, 2019; pp. 1-40.

Aldrich, Jeffrey B. et al.; "'Sweet Spot' Identification and Optimization in Unconventional Reservoirs" Search and Discovery Article #80644 (2018); pp. 1-6.

ArcGIS Pro 2.8; "An overview of the Density toolset" available as of Apr. 4, 2022 at: https://pro.arcgis.com/en/pro-app/2.8/tool-reference/spatial-analyst/an-overview-of-the-density-tools.htm; p. 1.

ArcGIS Pro 2.8; "How Kernel Density Works" Available as of Mar. 14, 2022 at: https://pro.arcgis.com/en/pro-app/2.8/tool-reference/spatial-analyst/how-kernel-density-works.htm; pp. 1-6.

ArcGIS Pro 2.8; "Kernel Density (Spatial Analyst)" available as of Mar. 14, 2022 at: https://pro.arcgis.com/en/pro-app/2.8/tool-reference/spatial-analyst/kernel-density.htm; pp. 1-5.

ArcGIS Pro 2.8; "Line Density (Spatial Analyst)" available as of Apr. 4, 2022 at: https://pro.arcgis.com/en/pro-app/2.8/tool-reference/spatial-analyst/line-density.htm; pp. 1-6.

ArcGIS Pro 2.8; "Point Density (Spatial Analyst)" available as of Apr. 4, 2022 at: https://pro.arcgis.com/en/pro-app/2.8/tool-reference/spatial-analyst/point-density.htm; pp. 1-7.

ArcGIS; "How Kernel Density works" available as of Jan. 28, 2022 at: https://desktop.arcgis.com/en/arcmap/10.6/tools/spatial-analyst-toolbox/how-kernel-density-works.htm; pp. 1-3.

ArcGIS; "How Line Density works" available as of Jan. 18, 2022 at: https://desktop.arcgis.com/en/arcmap/10.6/tools/spatial-analyst-toolbox/how-line-density-works.htm; pp. 1-3.

Azari, Mehdi et al.; "Determining the Formation Properties with Innovative Formation Integrity Test Designed Using a Wireline Straddle Packer, A Field Example" SPWLA 59th Annual Logging Symposium, Jun. 2-6, 2018; pp. 1-12.

Barree, R.D. et al.; "Holistic Fracture Diagnostics" SPE 107877, Rocky Mountain Oil & Gas Technology Symposium, Denver, CO, Apr. 16-18, 2007; pp. 1-13.

Barton, Colleen A. et al.; "Fluid flow along potentially active faults in crystalline rock" Geology; Aug. 1995; v.23; No. 8; pp. 683-686.

Bisdom, Kevin et al.; "A geometrically based method for predicting stress-induced fracture aperture and flow in discrete fracture networks" AAPG Bulletin v. 100, No. 7 (Jul. 2016); pp. 1075-1097.

Bisdom, Kevin et al.; "The impact of in-situ stress and outcrop-based fracture geometry on hydraulic aperture and upscaled permeability in fractured reservoirs" (abstract only) Tectonphysics v. 690, Part A, Oct. 28, 2010; pp. 63-75.

Blakely, Richard J.; "Potential Theory in Gravity and Magnetic Applications" Cambridge University Press, 1996; pp. 1-9.

Camargo, Otto E. Meza et al.; "Reservoir Stress Path from 4D Coupled High Resolution Geomechanics Model: A Case Study for Jauf Formation, North Ghawar, Saudi Arabia" Saudi Aramco Journal of Technology, Fall 2016; pp. 45-59.

Cao, Yang-Bing et al.; "Calculation Method and Distribution Characteristics of Fracture Hydraulic Aperture from Field Experiments in Fractured Granite Area" (abstract only), Springer Ling, Nov. 9, 2015; pp. 1-18.

Cappa, F. et al.; "Estimation of fracture flow parameters through numerical analysis of hydromechanical pressure pulses" Water Resources Research, American Geophysical Union, 2008, 44, pp. W11408; pp. 1-49.

Chen, Sheng et al.; "Prediction of sweet spots in shale reservoir based on geophysical well logging and 3D seismic data: A case study of Lower Silurian Longmaxi Formation in W4 block, Sichuan Basin, China" Energy Exploration & Exploitation, vol. 35(2), 2017; pp. 147-171.

Engelder, Terry et al.; "Chapter 15: A Pore-Pressure Limit in Overpressured South Texas Oil and Gas Fields" pp. 255-267, AAPG Memoir 67, 1997; pp. 255-267.

Ferreira, Francisco J.F. et al.; "Enhancement of the total horizontal gradient of magnetic anomalies using the tilt angle" Geophysics vol. 78, No. 3 (May-Jun. 2013); pp. J33-J41.

Fischer, K. et al.; "A workflow for building and calibrating 3-D geomechoanical models—a case study for a gas reservoir in the North German Basin" Solid Earth, 4, (2013); pp. 347-355.

Fischer, K. et al.; "Generating and Calibrating 3D Geomechanical Reservoir Models" 75th EAGE Conference and Exhibition incorporating SPE EUROPEC 2013, London UK, Jun. 10-13, 2013; pp. 1-5.

Friedman, Jerome H.; "Greedy Function Approximation: A Gradient Boosting Machine" 1999 Reitz Lecture, The Annals of Statistics (2001), vol. 29, No. 5; pp. 1189-1232.

Gan, Quan et al.; "A continuum model for coupled stress and fluid flow in discrete fracture networks" Geomech. Geophys. Geo-energ. Geo-resour. (2016); pp. 2:43-2:61.

Gray, F. David et al.; "Fracture detection in the Manderson Field: A 3D AVAZ case history" Society of Exploration Geophysicists, Jan. 5, 2005; pp. 1-4.

Gunn, P.J.; "Linear Transformations of Gravity and Magnetic Fields" Geophysical Prospecting vol. 23, Issue 2, Jun. 1974; pp. 300-312.

Han, Jiahang et al.; "Stress Field Change Due to Reservoir Depletion and Its Impact on Refrac Treatment Design and SRV in Unconventional Reservoirs" SPE-178496-MS/URTeC:2144941; Unconventional Resources Tech. Conf., Texas, Jul. 20-22, 2015; pp. 1-11.

Herwanger, J.; "Seismic Geomechanics, How to Build and Calibrate Geomechanical Models using 3D and 4D Seismic Data" 1 Edn., EAGE Publications b.v. Houten, 2011; Chapter 2, pp. 19-39, Chapter 6, pp. 102-118.

International Search Report and Written Opinion for International Application No. PCT/US2018/046824 report mail date Nov. 28, 2018; pp. 1-13.

International Search Report and Written Opinion for International Application No. PCT/US2020/062069, report mail date Mar. 11, 2021; pp. 1-18.

(56)                    References Cited

OTHER PUBLICATIONS

International Search Report and Written Opinion for International Application No. PCT/US2021/018379 report mail date May 28, 2021; pp. 1-16.

Jacquemyn, Carl et al.; "Mechanical stratigraphy and (paleo-) karstification of the Murge area (Apulia, southern Italy)" (abstract only) Geological Society, London, Special Publicationsvol. 370; pp. 169-186.

Jiang, Le et al.; "Simulation and Optimization of Dynamic Fracture Parameters for an Inverted Square Nine-Spot Well Pattern in Tight Fractured Oil Reservoirs" Hindawi, Geofluids, vol. 2020, Article ID 8883803; pp. 1-9.

Jorgensen, Bo Barker et al.; "Bacterial Sulfate Reduction Above 100C in Deep-Sea Hydrothermal Vent Sediments" (Abstract only) Science, vol. 258, Issue 5089, Dec. 11, 1992; pp. 1756-1757.

Khadivi, Kourosh et al.; "Integrated fracture characterization of Asmari reservoir in Haftkel field" Journal of Petroleum Exploration and Production Technology, Jan. 4, 2022; pp. 1-21.

Koutsabeloulis, N.C. et al.; "Numerical geomechanics in reservoir engineering" Computer Methods and Advances in Geomechanics, A.A. Balkema, Rotterdam, The Netherlands, 1994; pp. 2097-2104.

Lei, Qinghua et al.; "The use of discrete fracture networks for modelling coupled geomechanical and hydrological behaviour of fracture rocks" Computers and Geotechnics 85 (2017); pp. 151-176.

Liu, Naizhen et al.; "Shale gas sweet spot identification and precise geo-steering drilling in Weiyuan Block of Sichuan Basin, SW China" Petroleum Exploration and Development, vol. 43, Issue 6, Dec. 2016; pp. 1-9.

Liu, Shiqi et al.; "Geological and Engineering Integrated Shale Gas Sweet Spots Evaluation Based on Fuzzy Comprehensive Evaluation Method: A Case Study of Z Shale Gas Field HB Block" Energies 2022, 15, 602, Jan. 14, 2022; pp. 1-20.

Luthi, S.M. et al.; "Fracture apertures from electrical borehole scans" Geophysics, vol. 55, No. 7 (Jul. 1990); pp. 821-833.

Maerten, F.; "Adaptive cross-approximation applied to the solution of system of equations and post-Processing for 3D elastostatic problems using the boundary element Method" Engineering Analysis with Boundary Elements 34, 2010; pp. 483-491.

Matyasik, Irena et al.; "Genesis of hydrogen sulfide in carbonate reservoirs" NAFTA-GAZ, ROK LXXIV, Nr Sep. 2018; pp. 627-635.

Miller, Hugh G. et al.; "Potential field tilt—a new concept for location of potential field sources" Journal of Applied Geophysics 32 (1994); pp. 213-217.

Min, Ki-Bok et al.; "Stress-Dependent Permeability of Fractured Rock Masses: A Numerical Study" International Journal of Rock Mechanics and Mining Sciences, vol. 41, Issue 7 (2004); pp. 1191-1210.

Wickham, John et al.; "Geomechanics of Fracture Density" URTeC Control ID: 1619745, Unconventional Resources Tech Conf. (2013); pp. 1-9.

International Search Report and Written Opinion for International Application No. PCT/IB2024/061361, report mail date Apr. 2, 2025; pp. 1-14.

Naouali, B. Sarsar et al.; "Gravity Data Contribution for Petroleum Exploration Domain: Mateur Case Study (Saliferous Province, Northern Tunisia)" Arabian Journal for Science and Engineering vol. 42, No. 1, May 3, 2016; pp. 1-14.

* cited by examiner

STRESS-INDUCED

900

904

902

1200

1202

1304

1402

RadMax = 381981624289093

DEEP STRUCTURAL LINEAMENTS
FROM BASEMENT

MAXIMUM HORIZONTAL STRESS DIRECTION MODEL

DEEP STRUCTURAL LINEAMENTS FROM BASEMENT

MAXIMUM HORIZONTAL STRESS DIRECTION

DETERMINATION OF IN-SITU STRESS PERTURBATION USING POTENTIAL FIELDS DATA

BACKGROUND

Field of the Disclosure

The present disclosure generally relates to the extraction of hydrocarbon (for example, oil and gas) resources. More specifically, embodiments of the disclosure relate to the determination of in-situ stress perturbation in hydrocarbon reservoir formations using data from potential fields such as gravity and magnetism.

Description of the Related Art

The extraction of hydrocarbon resources from reservoirs in rock formations may depend on a variety of factors. Obtaining information about a hydrocarbon reservoir may be difficult due to the location and type of reservoir and associated formation, and the complexities of geomechanical phenomena. Geomechanical models have been available to model estimated stress conditions near wellbores in subsurface formations; however, such models may fail to accurately represent some formations and stress conditions.

SUMMARY

In-situ stress in a formation may be perturbed in both direction and magnitude due to presences of lineaments and reservoir depletion. Reservoir depletion may impact the stress magnitude and the direction due to the pore pressure reduction impacting the effective stress. Lineaments can produce in-situ stress perturbation due to stress concentration around the lineaments.

Existing techniques for generating a stress perturbation model are based on well data observation with borehole image and faults from seismic data. Additionally, sedimentary faulting patterns are influenced by basement tectonics and thus defining the basement faulting can be used in the study of (de) coupling between basement and cover deformation at different periods, conditioning further the stress perturbation model. However, if the well data and seismic data are not available, or the seismic data provides poor images of the subsurface geology, the stress perturbation model is less constrained and the results have higher uncertainty level.

Embodiments of the disclosure generally relate to the generation of an in-situ stress perturbation model by using potential fields data. Lineaments that define the structural framework of the basement are derived from an interpretation of calculated attributes of potential fields data. The lineaments are used as constraints in a finite element geomechanical simulation to generate the in-situ stress perturbation model.

As used in the disclosure, a lineament refers to a pseudo-linear geometrical feature of a geological structure that can be associated directly to a gravity anomaly or with a lateral variation of an anomaly attribute along a continuous pseudo-linear segment. Examples of lineaments include but not limited to faults, the edge of a basement block, the ridge of an eroded basement, the side of a salt diapir or folded structure, or magnetically contrasting formations.

In some embodiments, a method of determining in-situ stress perturbation using potential fields data to identify lineaments in a subsurface geological structure having a subsurface hydrocarbon reservoir is provided. The method includes determining an in-situ stress direction indicator in the subsurface geological structure, obtaining Bouguer gravity data in the subsurface geological structure, and processing the Bouguer gravity data to determine one or more attributes, the one or more attributes including an upward continuation, a spatial band-pass filter, a first vertical derivative, a horizontal gradient filter, a tilt angle filter, and a normalized horizontal gradient filter. The method also includes, generating one or more respective attribute maps based on the one or more attributes, each of the one or more attribute maps identifying a value of the attribute in the subsurface geological structure, and identifying a lineament in the subsurface geological structure from the one or more attribute maps. The method further includes combining the lineament and the in-situ stress direction indicator in a three-dimensional (3D) mechanical earth model to determine the in-situ stress perturbation in the subsurface geological structure.

In some embodiments, determining an in-situ stress direction indicator in the subsurface geological structure includes determining the in-situ stress direction indicator from a sonic or acoustic borehole image. In some embodiments, determining an in-situ stress direction indicator in the subsurface geological structure includes determining the in-situ stress direction indicator using azimuthal shear anisotropy analysis or multi-arm caliper analysis. In some embodiments, combining the lineament and the in-situ stress direction indicator in a three-dimensional (3D) mechanical earth model includes discretizing the lineament as a discontinuity. In some embodiments, the lineament is a first lineament and the method includes obtaining magnetic data and determining a second lineament from the magnetic data. In such embodiments, the method includes combining the first lineament and the second lineament into a set of lineaments. In some embodiments, the method includes identifying a location in the subsurface geological structure for a well using the in-situ stress perturbation. In such embodiments, the method also includes drilling a well in the subsurface geological structure at the identified location.

In another embodiment, a non-transitory computer-readable storage medium having executable code stored thereon for determining in-situ stress perturbation using potential fields data to identify lineaments in a subsurface geological structure having a subsurface hydrocarbon reservoir. The executable code includes a set of instructions that causes a processor to perform operations that include determining an in-situ stress direction indicator in the subsurface geological structure, obtaining Bouguer gravity data in the subsurface geological structure, and processing the Bouguer gravity data to determine one or more attributes, the one or more attributes including an upward continuation, a spatial band-pass filter, a first vertical derivative, a horizontal gradient filter, a tilt angle filter, and a normalized horizontal gradient filter. The operations also include generating one or more respective attribute maps based on the one or more attributes, each of the one or more attribute maps identifying a value of the attribute in the subsurface geological structure, and identifying a lineament in the subsurface geological structure from the one or more attribute maps. The operations further include combining the lineament and the in-situ stress direction indicator in a three-dimensional (3D) mechanical earth model to determine the in-situ stress perturbation in the subsurface geological structure.

In some embodiments, determining an in-situ stress direction indicator in the subsurface geological structure includes determining the in-situ stress direction indicator from a sonic or acoustic borehole image. In some embodiments, determining an in-situ stress direction indicator in the subsurface geological structure includes determining the in-situ stress direction indicator using azimuthal shear anisotropy analysis or multi-arm caliper analysis. In some embodiments, combining the lineament and the in-situ stress direction indicator in a three-dimensional (3D) mechanical earth model includes discretizing the lineament as a discontinuity. In some embodiments, the lineament is a first lineament and the operations include obtaining magnetic data and determining a second lineament from the magnetic data. In such embodiments, the operations include combining the first lineament and the second lineament into a set of lineaments. In some embodiments, the operations include identifying a location in the subsurface geological structure for a well using the in-situ stress perturbation. In such embodiments, the operations also include controlling the drilling of a well in the subsurface geological structure at the identified location.

In some embodiments, a system for determining in-situ stress perturbation using potential fields data to identify lineaments in a subsurface geological structure having a subsurface hydrocarbon reservoir is provided. The system includes a processor and a non-transitory computer-readable memory accessible by the processor and having executable code stored thereon. The executable code includes a set of instructions that causes the processor to perform operations that include determining an in-situ stress direction indicator in the subsurface geological structure, obtaining Bouguer gravity data in the subsurface geological structure, and processing the Bouguer gravity data to determine one or more attributes, the one or more attributes including an upward continuation, a spatial band-pass filter, a first vertical derivative, a horizontal gradient filter, a tilt angle filter, and a normalized horizontal gradient filter. The operations also include generating one or more respective attribute maps based on the one or more attributes, each of the one or more attribute maps identifying a value of the attribute in the subsurface geological structure, and identifying a lineament in the subsurface geological structure from the one or more attribute maps. The operations further include combining the lineament and the in-situ stress direction indicator in a three-dimensional (3D) mechanical earth model to determine the in-situ stress perturbation in the subsurface geological structure.

In some embodiments, determining an in-situ stress direction indicator in the subsurface geological structure includes determining the in-situ stress direction indicator from a sonic or acoustic borehole image. In some embodiments, determining an in-situ stress direction indicator in the subsurface geological structure includes determining the in-situ stress direction indicator using azimuthal shear anisotropy analysis or multi-arm caliper analysis. In some embodiments, combining the lineament and the in-situ stress direction indicator in a three-dimensional (3D) mechanical earth model includes discretizing the lineament as a discontinuity. In some embodiments, the lineament is a first lineament and the operations include obtaining magnetic data and determining a second lineament from the magnetic data. In such embodiments, the operations include combining the first lineament and the second lineament into a set of lineaments. In some embodiments, the operations include identifying a location in the subsurface geological structure for a well using the in-situ stress perturbation. In such embodiments, the operations also include controlling the drilling of a well in the subsurface geological structure at the identified location.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
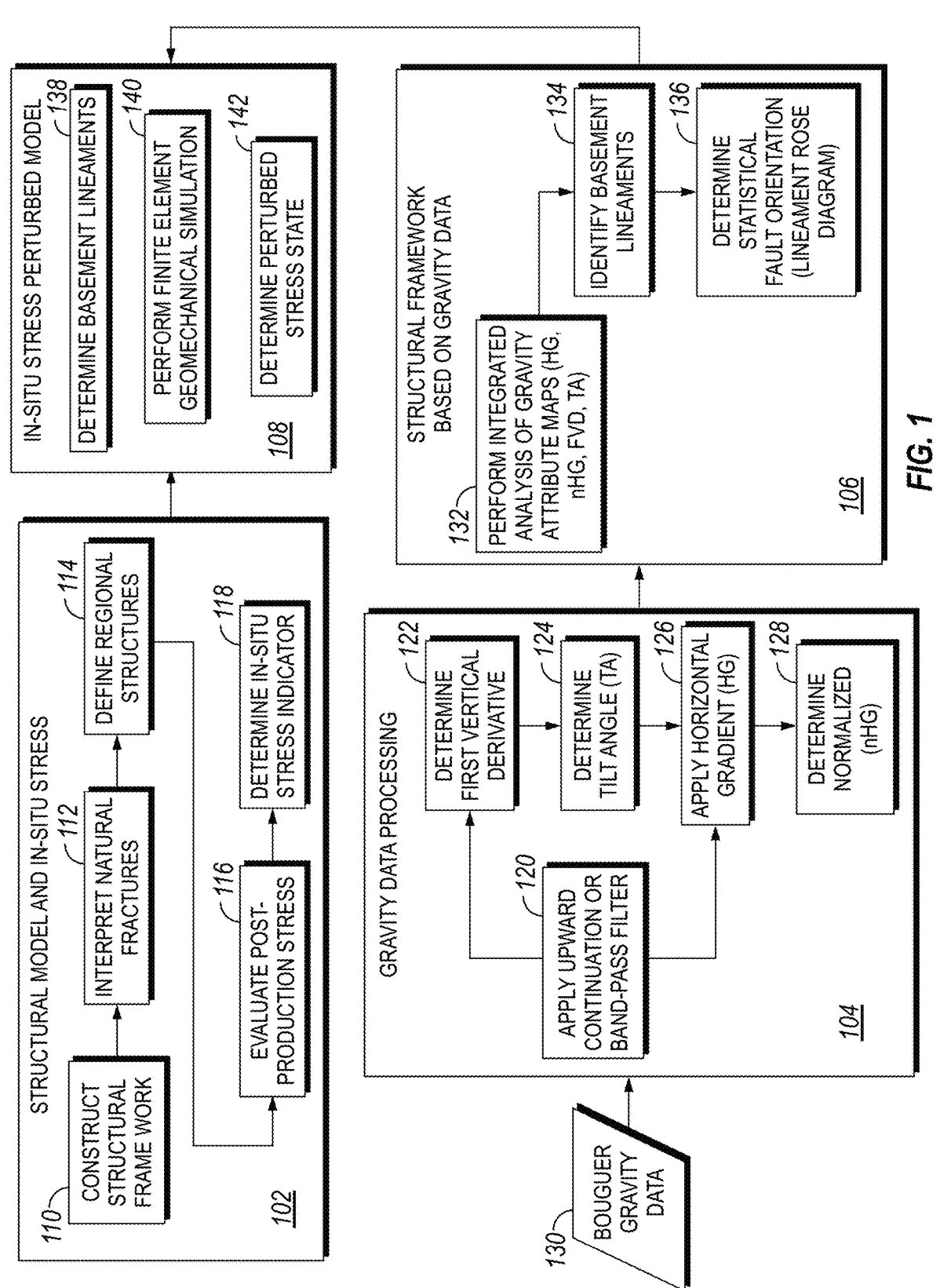
FIG. 1 is a block diagram of a process for identifying and drilling wells using determined in-situ stress perturbation in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure are directed to processes and systems for the generation of an in-situ stress perturbation model by using potential fields data. Lineaments that define the structural framework of the basement may be derived from an interpretation of specifically calculated attributes of potential fields data. The potential fields data may include gravity data, or gravity data and magnetic data. The derived lineaments are used as constraints in a finite element geomechanical simulation to generate the in-situ stress perturbation model. The in-situ stress perturbation model may be used to identify locations in a formation for drilling a well and extracting hydrocarbons from a hydrocarbon-bearing reservoir.

Gravity anomalies in formations of interest may be generated by lateral variations of densities of underground rocks. These variations may be significant at different depth ranges. The variations may be caused by intra-sedimentary structures (for example, salt domes), basement topography (for example, horsts and grabens), changes in basement composition (for example, oceanic vs continental type of basement), vertical variations of Mohorovičić boundary (via the creation of a lateral density contrast between high density mantle and lower density basement above it), and mantle temperature variations (for example, a relatively greater temperature is associated with a lower density and is typically associated within rifting areas). Variations may be caused by any one of or a combination of the foregoing causes.

As used in the disclosure, a "lineament" refers to a pseudo-linear geometrical feature of a geological structure that can be associated directly to a gravity anomaly or with a lateral variation of an anomaly attribute along a continuous pseudo-linear segment. Non-limited examples of lineaments are discussed infra.

A lineament may correspond to a fault, such as when there is complementary evidence for a vertical throw that is significant when compared with the distance to the device that measured the gravity data. A lineament may also correspond to the edge of a basement block, to the ridge of an eroded basement, to the side of a salt diapir or any folded structure that juxtaposes laterally density, or magnetically contrasting formations (such as reef edges, carbonates in general, edges of volcanic sills, basalt flows, etc.). A lineament may also correspond to the tops and edges of dikes, or significant changes in the geometry of metamorphic rocks. An area of interest may include one or more of these different types of lineaments.

The lineaments may be generally related to the effect of the stress regime in an area of interest, revealing the main directions of such stress. Consequently, as formations of different densities are juxtaposed along these faults, gravity data may be used to track these faults and then used in combination with other data to define a structural framework and constrain stress perturbation modeling according to the techniques described in the disclosure.

FIG. 1 depicts a process 100 for identifying and drilling wells using determined in-situ stress perturbation in accordance with an embodiment of the disclosure. As shown in FIG. 1, the process 100 includes determining a structural model and in-situ stress (block 102), processing gravity data may be processed (block 104), and determining a structural framework based on the gravity data (block 106). Using the structural model and validated in-situ stress, and the structural framework based on gravity data, an in-situ stress perturbation model may be determined (block 108). Using the in-situ stress perturbation model, existing and future well locations may be evaluated for wellbore stability. Further well locations may be identified, and wells may be drilled at the identified locations.

The structural model and in-situ stress determination (block 102) includes the determination of a structural model that identifies the geological formation where the in-situ stress will be modeled and identified. In-situ stress may be described from resistive or sonic borehole image identifying wellbore failures such as breakouts and drilling induced tensile fractures. The structural model and in-situ stress validation determination (block 102) for the geological region of interest includes the construction of a structural framework (block 110), the interpretation of natural fractures (block 112), determining a regional structural setting (block 114), a post-production stress evaluation (block 116), and determining an in-situ direction indicator (block 118).

Figures 2A, 2B:
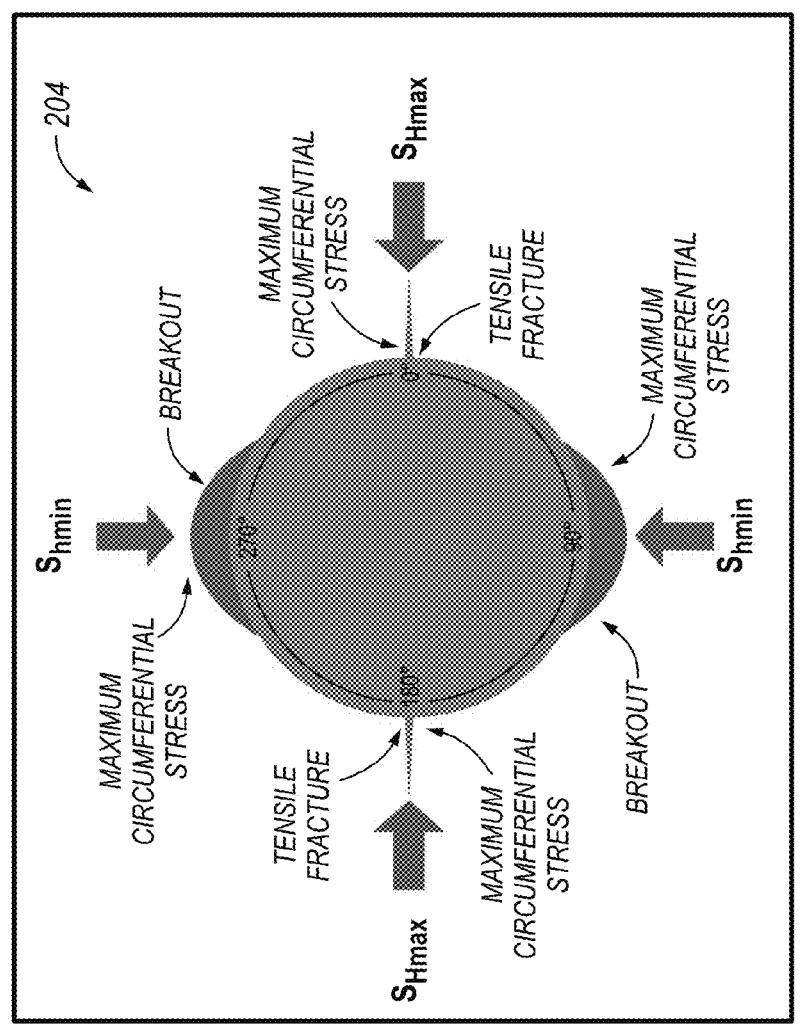
FIGS. 2A and 2B depict the graphical identification of geological features and stresses from a borehole image in accordance with an embodiment of the disclosure.

A structural framework may be constructed (block 110) using formation well tops, interpolating the surfaces, and applying structural gridding modeling techniques to generate a surfaces map. The interpretation of natural fractures (block 204) includes obtaining borehole images and interpreting the borehole images to interpret geological features. In some embodiments, the borehole images may include sonic borehole images, resistive borehole images, or both. The geological features may include natural fractures, drilling tensile inducted fractures, and breakouts. By way of example, FIGS. 2A and 2B depict the graphical identification of geological features and stresses from a borehole image in accordance with an embodiment of the disclosure. FIG. 2A depicts an example resistive borehole image 200 and the identification of breakouts 202 from the image. In another example, FIG. 2B depicts a relationship 204 between minimum horizontal stress ($S_{hmin}$) and maximum horizontal stress ($S_{Hmax}$), minimum and maximum circumferential stresses, and identifiable geological features of tensile fractures and breakouts in accordance with an embodiment of the disclosure.

Additionally, determining a structure model and in-situ stress may include defining the regional structures (block 114) by the stress regime or tectonic settings present in the region of interest. In some embodiments, the stress regime may be defined using a one-dimensional (1-D) mechanical earth model. In some embodiments, the mechanical earth model may be implemented according to the techniques described in U.S. patent application Ser. No. 16/792,742 filed Feb. 17, 2020, and titled "DETERMINATION OF CALIBRATED MINIMUM HORIZONTAL STRESS MAGNITUDE USING FRACTURE CLOSURE PRES-SURE AND MULTIPLE MECHANICAL EARTH MODEL REALIZATIONS," now issued U.S. Pat. No. 11,098,582, a copy of which is incorporated by reference in its entirety.

In-situ stress may be determined from a mechanical earth model. Initially, mechanical properties for a formation may be determined. The mechanical properties may include static rock mechanical properties and dynamic rock mechanical properties. Static rock mechanical properties may be deter-mined through static rock mechanical properties testing of rock samples. The rock samples may include core plugs with precise dimensions and conditions. In some embodiments, the tests of rock samples may include uniaxial core tests to determine rock stress-strain relations as functions of forma-tion rock as functions of applied tensile or compressive loads. In some embodiments, the tests of rock samples may include single or multi-stage tri-axial rock mechanical tests to provide data representing measures rock strength and mechanical conditions to simulate in-situ stress conditions providing compressive strength and static values of elastic constants of the rock.

The static rock mechanical properties may include static Young's modulus. As known in the art, the static Young's modulus may be determined from the slope $$\frac{\Delta\sigma}{\Delta\varepsilon a}$$

of a specific portion (50% peak stress) of a stress-strain curve of stress-strain ratio E. The stress-strain ratio E of a rock sample may be determined as the ratio of axial stress ($\Delta\sigma$) and axial strain ($\Delta\varepsilon a$). The static rock mechanical properties may also include Poisson's ratio. The Poisson's ratio the negative of the ratio of transverse strain to the axial strain in an elastic material subjected to a uniaxial stress and may be determined from the slope $$\frac{\varepsilon_r}{\varepsilon a}$$

of a specific portion of a radial strain-axial strain curve.

The dynamic rock mechanical properties may include, for example, dynamic Young modulus, shear modulus, and bulk modulus, and Poisson's ratio. In some embodiments, dynamic rock mechanical properties may be determined from compressional sonic logs, shear sonic logs, and density logs obtained from well logging tools. A relationship may be determined between the status Young's modulus (YMS) and dynamic Young modulus (YMD) and other properties for a comparison.

The stress magnitude and orientation for the mechanical earth model may then be determined. The overburden (that is, vertical stress ($S_v$)) may be calculated from bulk density logs and a compaction line technique. The vertical stress ($S_v$) is the intermediate principal stress in a slip-strike regime. The minimum horizontal stress ($S_{hmin}$) may be calculated from fracture closure pressure (such as determined by a leak-off test (LOT)). The maximum horizontal stress ($S_{Hmax}$) may be determined by assuming a strike-slip fault regime wherein the maximum horizontal stress ($S_{Hmax}$) is the largest principal stress (that is, $S_{Hmax} > S_v > S_{hmin}$). The orientation of the maximum horizontal stress may be deter-mined using wellbore failure analysis such as borehole breakouts and drilling-induced tensile fractures interpreted from a borehole image (BHI) log.

A minimum horizontal stress ($S_{hmin}$) and maximum hori-zontal stress ($S_{Hmax}$) profile may be determine using a poro-elastic and horizontal-strain stress approach, wherein the minimum horizontal stresses and maximum horizontal stresses at each depth depend on the following factors: 1) mechanical properties; 2) pore pressure; and 3) vertical stress (overburden). The pore pressure may be determined from direct measurements using MDT (Modular Formation Dynamics) and Bottom Hole Static Pressure (BHSP) as known in the art. The maximum horizontal stress ($S_{Hmax}$) may also be constrained by using wellbore stability model and drilling events (for example, mud lost circulation, stuck pipes, in-flow, and tight hole).

Figure 3:
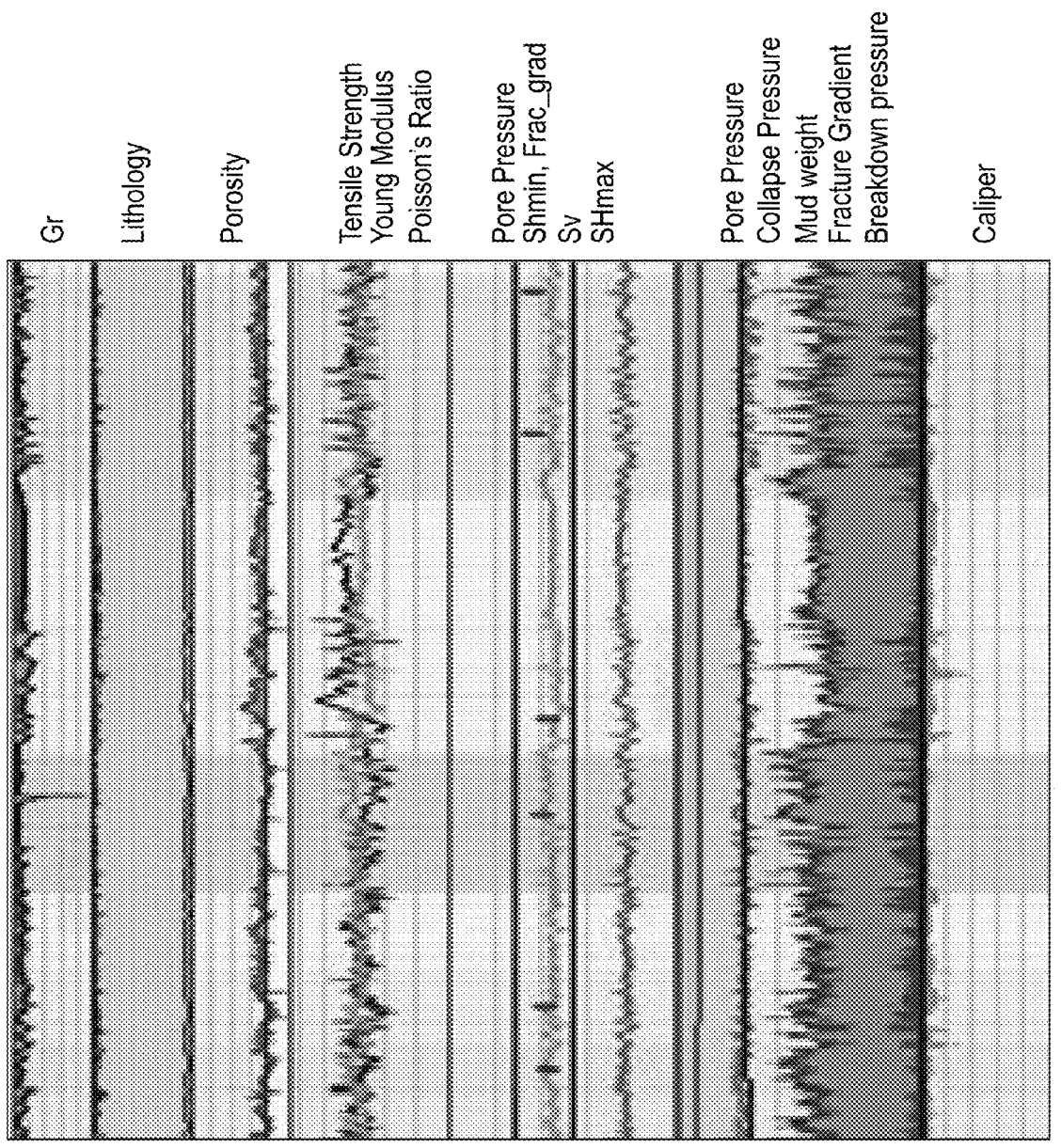
FIG. 3 is a composite log showing measured properties and corresponding determinations for a region of interest in accordance with an embodiment of the disclosure.

FIG. 3 is a composite log 300 showing gamma ray (Gr) measurements (302), lithology (304), porosity (306), prop-erties (308) such as tensile strength, Young's Modulus, and Poisson's Ratio, pore pressure (310), minimum horizontal stress ($S_{hmin}$) with fracture gradients (312), vertical stress ($S_v$) (314), and maximum horizontal stress ($S_{hmax}$) (316), in accordance with an embodiment of the disclosure. The composite log 300 of FIG. 3 also shows collapse pressure (318), mud weight (320), fracture gradient (322), breakdown pressure (324) and caliper measurement (that is, borehole size) (326).

Figure 4:
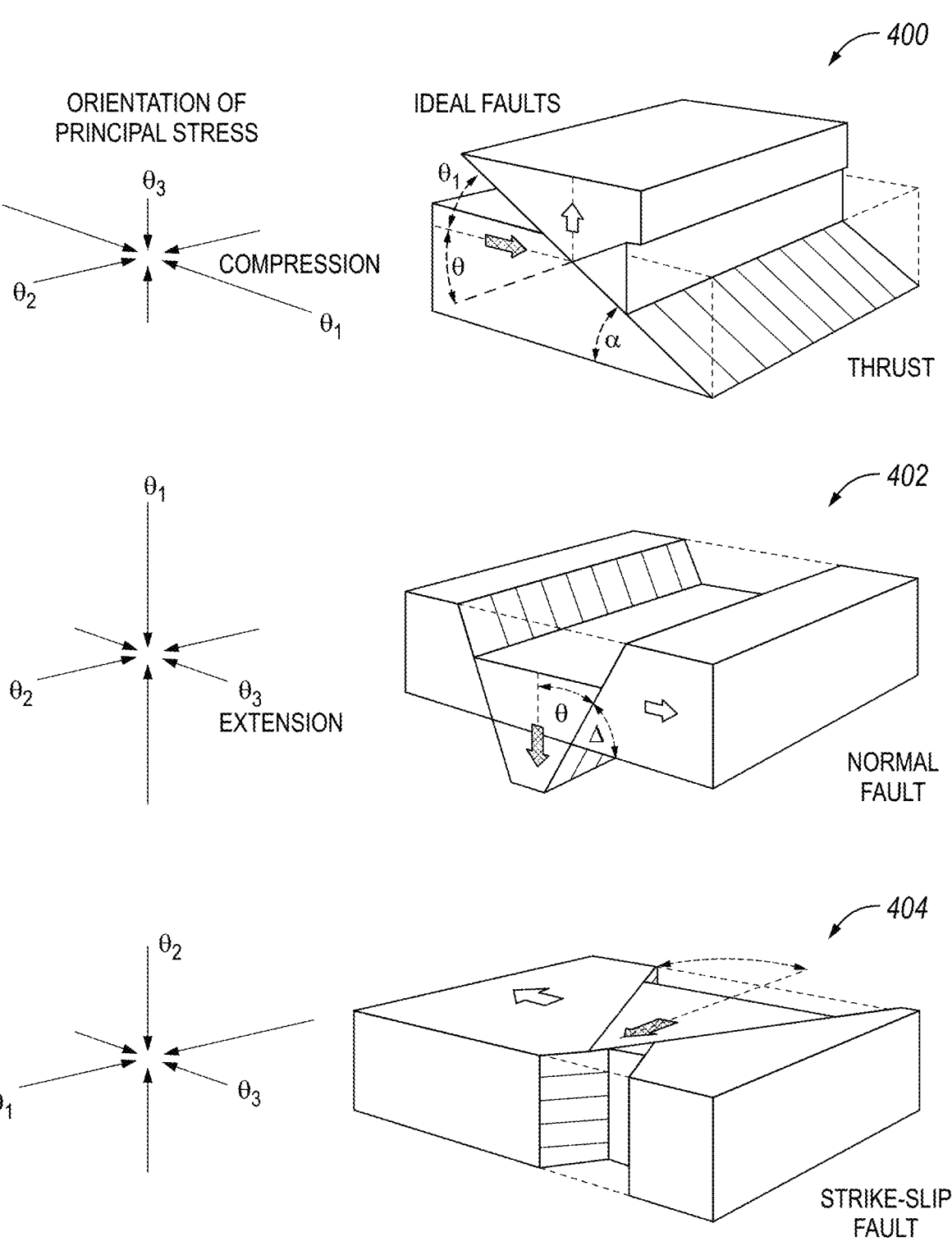
FIG. 4 is a schematic diagram of different stress regimes and faults in accordance with an embodiment of the disclosure.

Using the stress regime for the region of interest, the kinematics of the lineaments defined by gravity or magnetic attributes may be inferred. These kinematics are primarily controlled by the particular stress regime and corresponding fault, such as strike-slip, normal, thrust, or reverse. By way of example, FIG. 4 depicts different stress regimes and faults in accordance with an embodiment of the disclosure. For example, FIG. 4 depicts the orientation of principal stresses for a thrust fault regime 400, a normal fault regime 402, and a strike-slip fault regime 404.

Next, the post-production stress may be evaluated (block 116). In certain regions, variation in the in-situ stress regime may result from the production or changes in pore pressure due to depletion or injection. In some embodiments, the evaluation of post-production stress may be performed using geomechanical simulation software to model depletion or injection by considering one-way coupling scenarios. For example, the geomechanical simulation software may include VISAGE™ manufactured by Schlumberger Limited of Houston, Texas, USA. In some embodiments, the in-situ stress regime perturbation resulting from depletion may be captured without any lineman or discontinuity present in the region; in such instances, in-situ stress regime perturbation may be identified using wellbore failure from time-lapsed borehole images at different periods, such as the beginning of production and at maximum depletion condition.

Figure 5B:
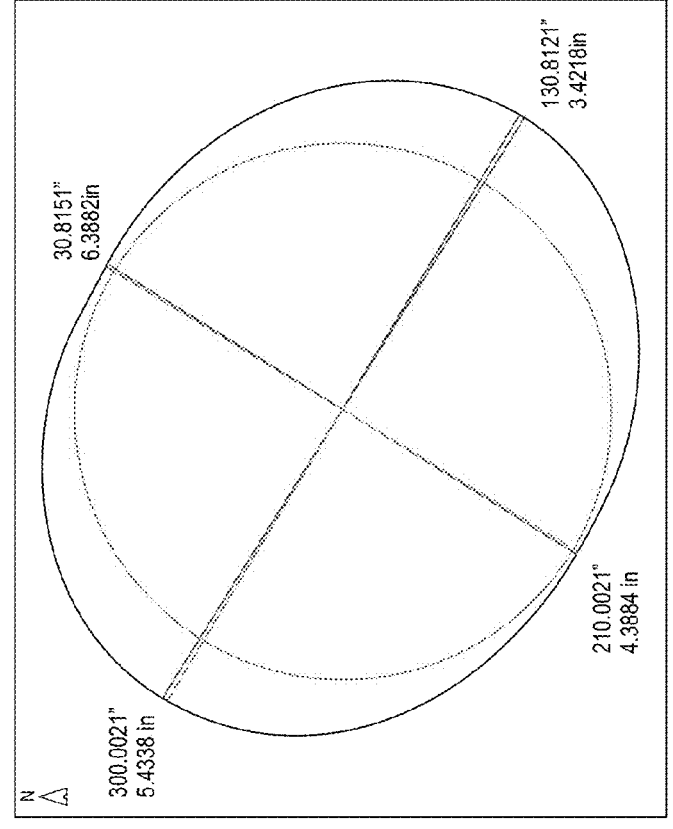
FIGS. 5A and 5B depict the determination of minimum and maximum horizontal stress direction using a multi-arm caliper tool in accordance with an embodiment of the disclosure.
Figure 5A:
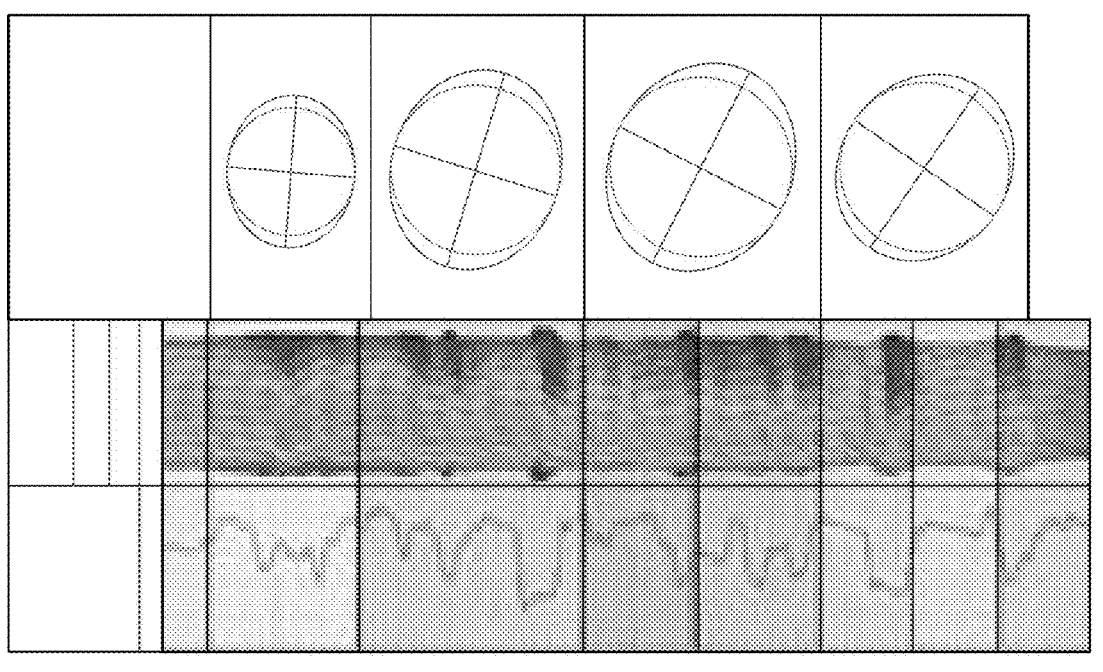
Figure 6:
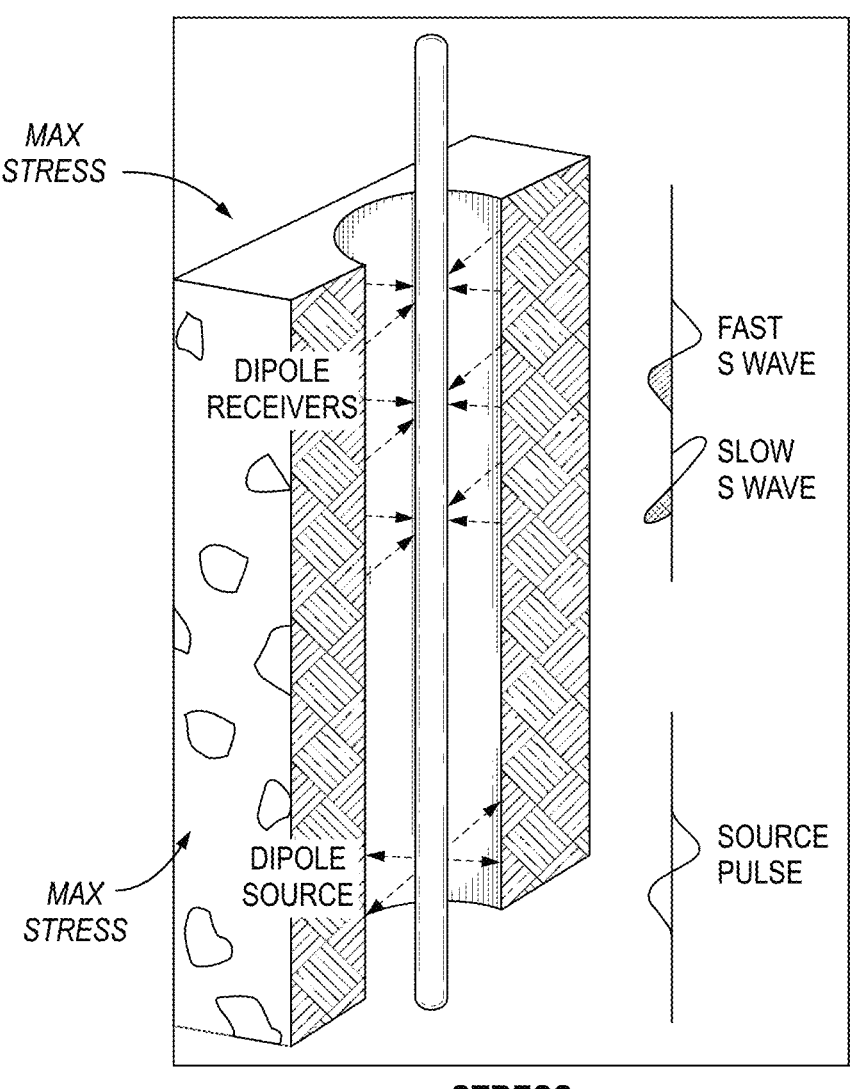
FIG. 6 is a schematic diagram depicting the determination of maximum horizontal stress direction from fast shear anisotropy in accordance with an embodiment of the disclosure.

As shown in FIG. 1, the in-situ stress direction indicator (for example, an indication of the maximum horizontal stress direction) may be determined (block 118). In some embodiments, the in-situ stress direction indicator may be determined from the borehole image used for the natural fracture interpretation (block 112). In other embodiments, the in-situ stress direction indicator may be determined using other techniques, such as azimuthal shear anisotropy analysis or multi-arm caliper analysis. By way of example, FIGS. 5A and 5B depict the determination of minimum and maximum horizontal stress direction using a multi-arm caliper tool in accordance with an embodiment of the disclosure. In another example, FIG. 6 is a schematic diagram depicting the determination of maximum horizontal stress direction from fast shear anisotropy in accordance with an embodiment of the disclosure.

As shown in FIG. 1, the process 100 includes gravity data processing 104. The gravity data processing includes applying an upward continuation, band-pass filter, or combination thereof (block 120), determining a first vertical derivative (block 122), determining a title angle (block 124), determining a horizontal gradient (HG) (block 126), and determining a normalized horizontal gradient (HG) (block 128).

The gravity data processing 104 may receive observed gravity data (130), also referred to as a Bouguer anomaly or Bouguer gravity data (i.e., gravity measured by a gravity survey). The magnitude of observed Bouguer gravity anomaly depends on the lateral variations of density within the rocks beneath the surveyed area, and on the depth range where the contrasts occur, relative to measuring sensor elevation.

In some embodiments, the process 100 may include performing a gravity survey. A potential field survey, such as a gravity survey, may be performed by measuring potential field data at specific locations or continuously along certain profiles. The measurements are acquired by specific instruments, which, for a gravity survey, include one or more of: gravimeters (measuring gravity field) and gravity gradiometers (measuring gravity field gradient), For a magnetic survey, the instrument may include one or more of: a vector magnetometer and true magnetic gradiometer data. The gravimeter instruments may measure relative or absolute values of gravitational pull at a location. The measurements may be carried out also while moving the instrument. These initial raw measurements may be applied using processing workflows known in the art to obtain Bouguer gravity anomaly. In some instances, the processing workflows may be specific to the specific instrument or instruments, type of survey, and environment context. A gravity survey may include an airborne, shipborne or land gravity survey, and each of these surveys may include gradiometry gravity measurements. In some embodiments, different types of gravity surveys may partially overlap over a larger area, such that their data may be merged into a unique set and produce a unique Bouguer gravity anomaly produced for an area.

Figure 7A:
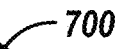
FIG. 7A depicts a measured Bouguer anomaly in a region of interest in accordance with an embodiment of the disclosure.
Figure 7A:
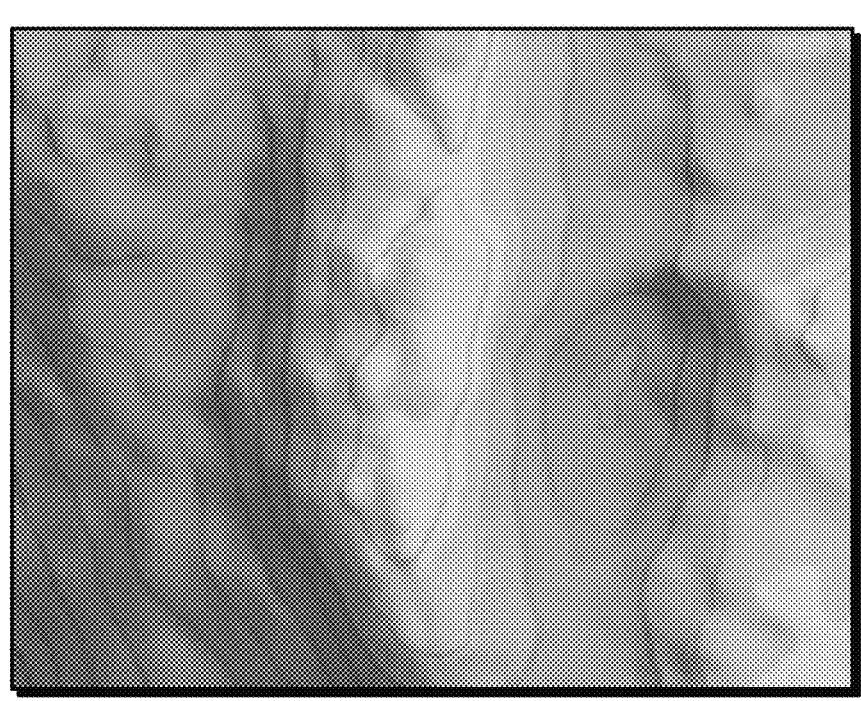
Figure 7B:
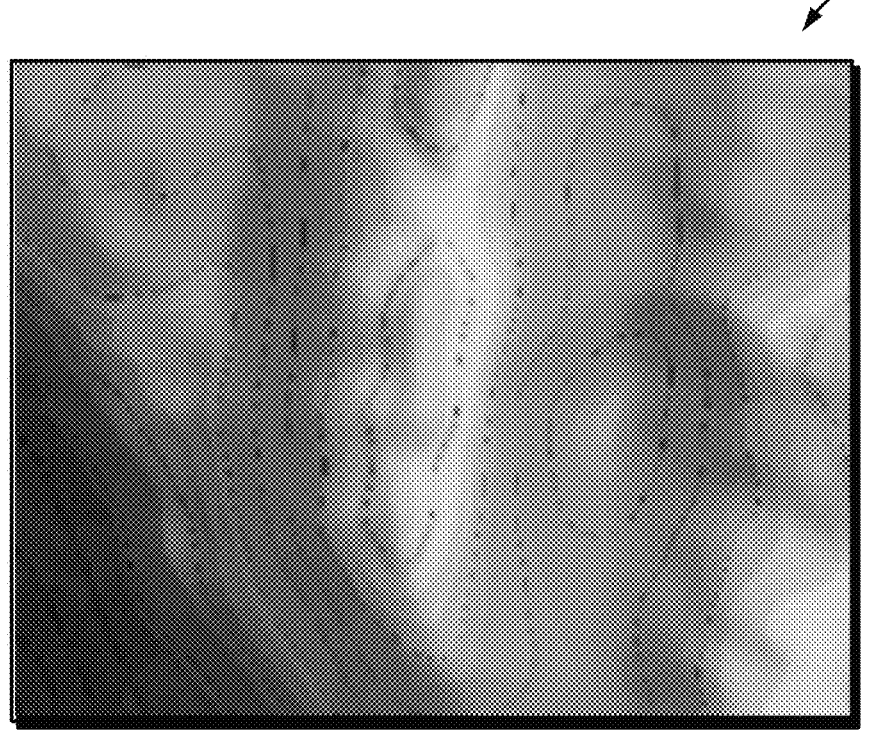
FIG. 7B depicts the Bouguer anomaly of FIG. 7A after application of a 1 kilometer (km) upward continuation in accordance with an embodiment of the disclosure.

Initially, an upward continuation (UC) may be applied to the Bouguer gravity data (block 120). The upward continuation (UC) may reduce the gravity response components that are not part of the fault analysis (for example, too shallow sharp lateral density variations and short-wavelength data noise). The upward continuation (UC) may adjust the respective elevation of measured gravity data to a higher elevation to calculate the corresponding gravity data as if it were measured at the higher elevation. By way of example, FIG. 7A depicts a measured Bouguer anomaly 700 in a region of interest, and FIG. 7B depicts the Bouguer anomaly 702 of FIG. 7A after application of a 1 kilometer (km) upward continuation in accordance with an embodiment of the disclosure.

Figure 8A:
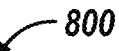
FIG. 8A depicts a measured Bouguer anomaly in a region of interest in accordance with an embodiment of the disclosure.
Figure 8A:
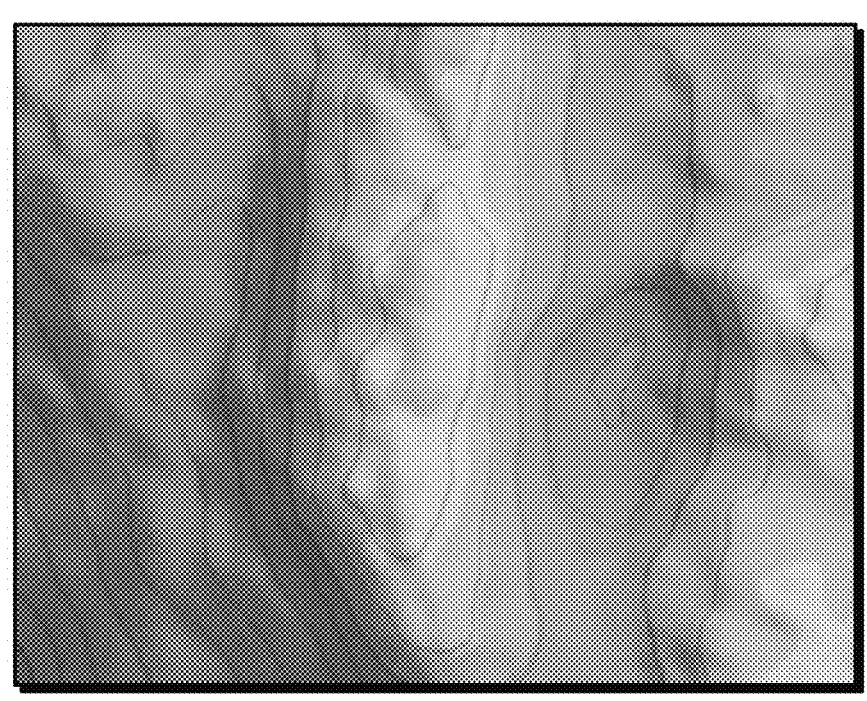
Figure 8B:
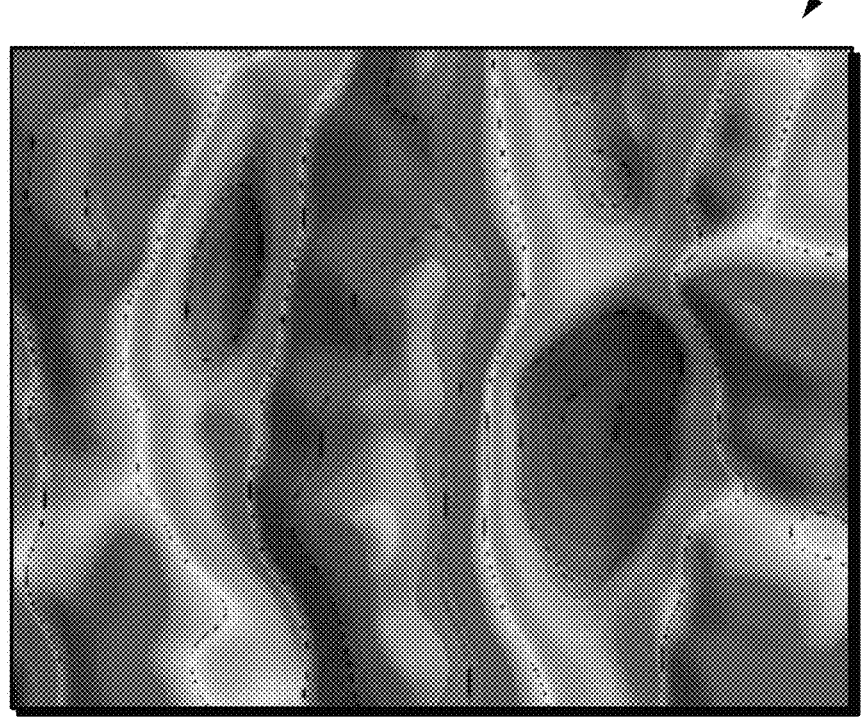
FIG. 8B depicts the Bouguer anomaly of FIG. 8A after application of an 8 kilometer (km) to 64 km spatial band-pass (BP) filter in accordance with an embodiment of the disclosure.

Additionally, in some embodiments, a spatial band-pass (BP) filter may be applied to the gravity data as a smoothing operation to facilitate delineation of lineaments on higher order derivatives of the gravity anomaly (for example, first vertical derivative or horizontal gradient). As will be appreciated, the spatial band-pass (BP) filter may filter out shorter wavelength (data noise) and longer wavelength components (regional trends) of the gravity anomalies, thus acting also as focusing operator on a limited depth range. By way of example, FIG. 8A depicts a measured Bouguer anomaly in a region of interest (such as also shown in FIG. 7A), and FIG. 8B depicts the Bouguer anomaly of FIG. 8A after application of an 8 kilometer (km) to 64 km spatial band-pass (BP) filter in accordance with an embodiment of the disclosure. As shown in FIGS. 8A and 8B, wavelength anomalies shorter than 8 km and longer than 64 km in the Bouguer anomaly may be attenuated to minimize shallow and very deep gravity responses associated with, for example, lateral density variations due to outcropping formations (shallow gravity responses) and respectively asthenosphere temperature and depth to Moho variations (very deep gravity responses). The application of a spatial band-pass (BP) filter removes these responses in the evaluation of the stress perturbation model.

Next, a first vertical derivative (FVD) filter may be applied to the processed gravity data (block 122). The first vertical derivative (FVD) filter may be applied to the upward continued gravity data to further determine the lineament delineation. An n-order vertical derivate of potential fields data (for example, gravity) may be calculated in the frequency domain according to Equation 1:

$$\frac{\partial^n G}{\partial z^n} = G(f)|f|^n \tag{1}$$

Where G(f) is the amplitude of spectral component at frequency f. The first vertical derivative may be calculated from Equation 1 with n=1. The output product of the FVD may be combined with other filters and further used to determine lineaments. For example, a vertical fault is associated with inflexion points on the magnitude map of the first vertical derivative. Thus, a lineament may be interpreted by closely tracing it along inflexion points of one side of an FVD anomaly, while concurrently considering the correlation with other attributes, such as maximum contours of horizontal gradient and secondarily with zero contours of tilt angle.

Figure 9A:
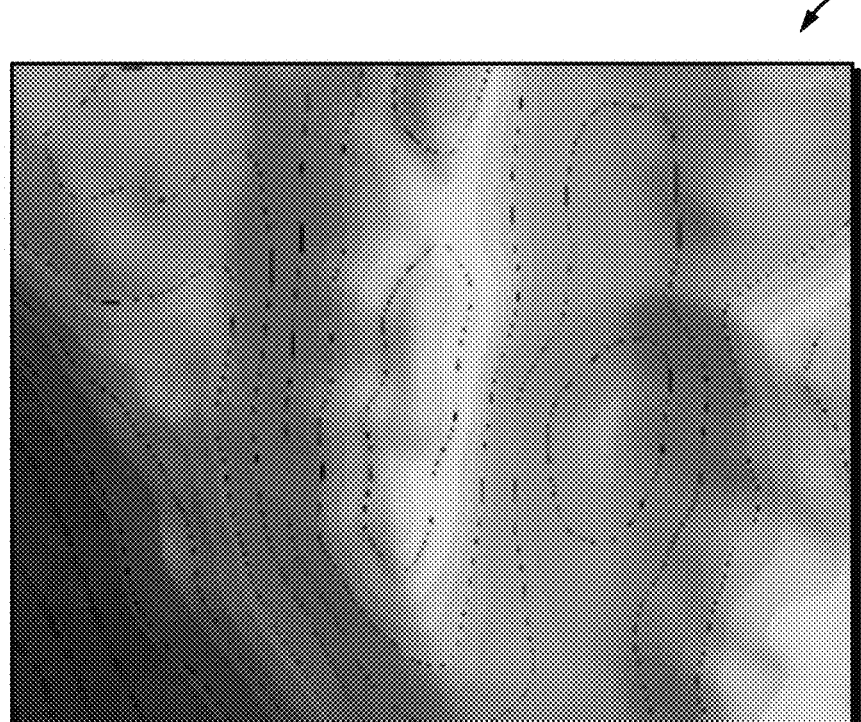
FIG. 9A depicts a 1 km upward continued Bouguer anomaly in accordance with an embodiment of the disclosure.
Figure 9B:
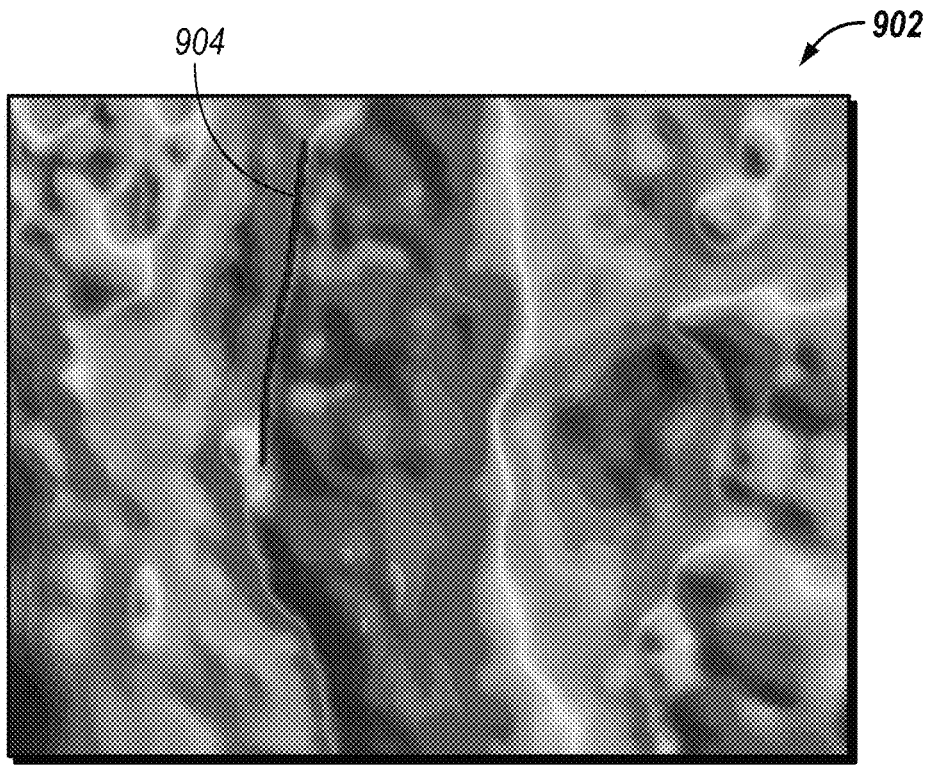
FIG. 9B depicts the first vertical derivative attribute map of the Bouguer anomaly of FIG. 9A in accordance with an embodiment of the disclosure.

Additionally, in some embodiments, a horizontal gradient (HG) may be applied to the FVD to better track the peaks on the cascaded filter than as inflexion points on the FVD, as the inflexion points on the FVD correspond to the maxima on the horizontal gradient (HG) of the FVD. By way of example, FIG. 9A depicts a 1 km upward continued Bouguer anomaly 900, and FIG. 9B depicts the first vertical derivative attribute map 902 of the Bouguer anomaly of FIG. 9A in accordance with an embodiment of the disclosure. The first vertical derivative attribute map of FIG. 9B depicts an interpreted lineament (blue line 904) along inflexion points of one side of the central FVD anomaly.

Next, as shown in FIG. 1, a horizontal gradient (HG) filter is applied to the upward continued gravity data to further determine the lineament delineation (block 126). The output of the applied horizontal gradient (HG) filter, in combination with other filters, may be further used for interpreting lineaments. As used herein, "horizontal gradient" (HG) is the magnitude of horizontal decay or increase rate of the upward continued gravity anomaly. The HG is a positive value when calculated on gridded data (as opposed to a negative value, such as negative when calculated along a profile).

Figure 10A:
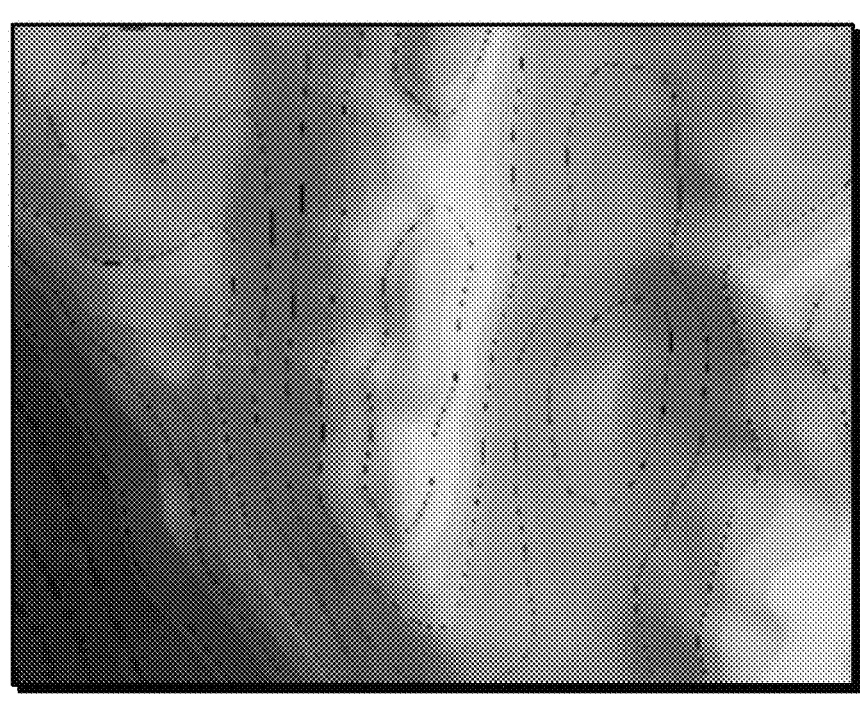
FIG. 10A depicts a 1 km upward continued Bouguer anomaly in accordance with an embodiment of the disclosure.
Figure 10B:
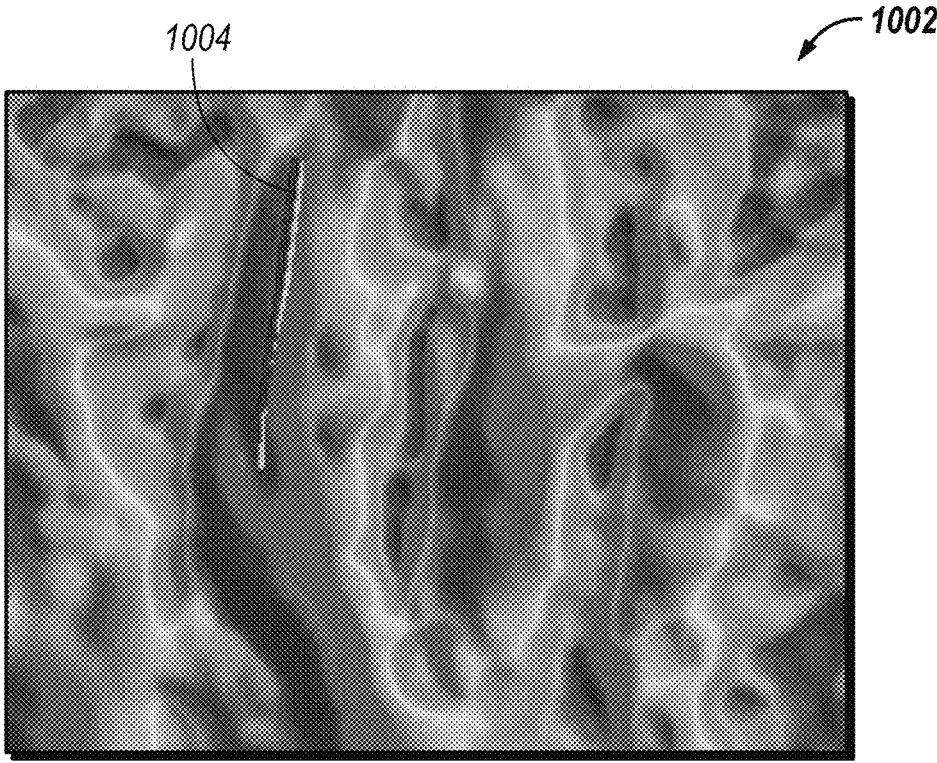
FIG. 10B depicts the horizontal gradient (HG) attribute map of the Bouguer anomaly of FIG. 10A in accordance with an embodiment of the disclosure.
Figure 11A:
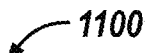
FIG. 11A depicts a 1 km upward continued Bouguer anomaly in accordance with an embodiment of the disclosure.
Figure 11A:
Figure 11B:
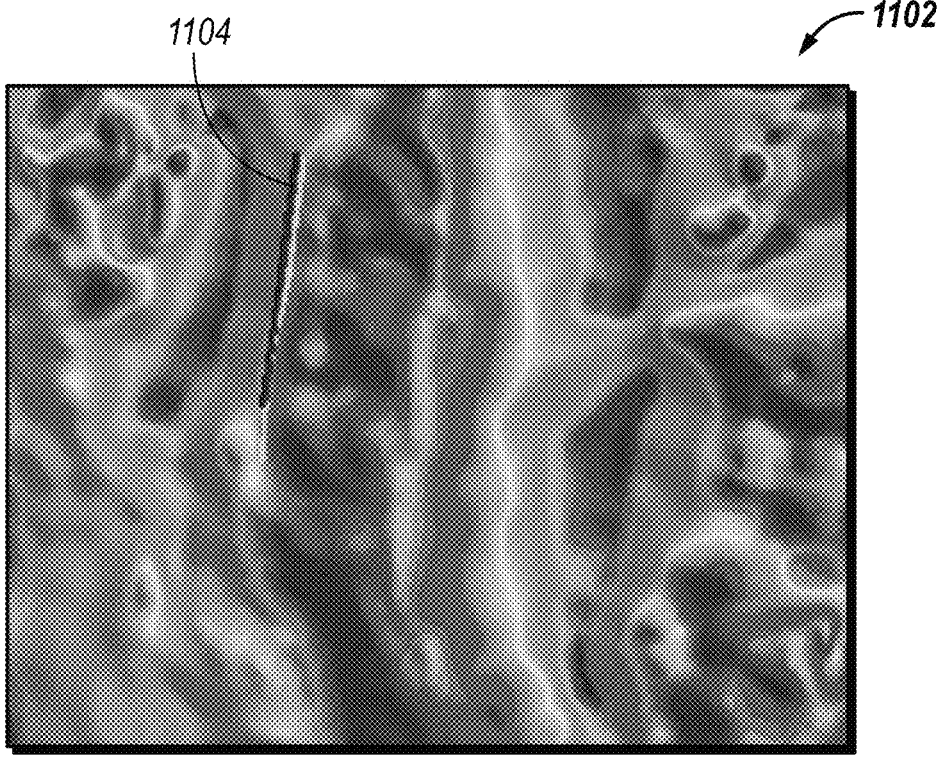
FIG. 11B depicts the tilt angle attribute map of the Bouguer anomaly of FIG. 11A in accordance with an embodiment of the disclosure.

A vertical fault, juxtaposing formations of contrasting densities, is associated with a maximum on horizontal gradient. Thus, a lineament may be interpreted by closely tracing it along the peaks of one HG anomaly, while concurrently considering the correlation with other attributes (such as inflexion points of the first vertical derivative, and secondarily with zero contours of tilt angle). By way of example, FIG. 10A depicts a 1 km upward continued Bouguer anomaly 1000, and FIG. 10B depicts the horizontal gradient (HG) attribute map 1000 of the Bouguer anomaly of FIG. 10A in accordance with an embodiment of the disclosure. The horizontal gradient (HG) attribute map of FIG. 11B depicts an interpreted lineament (blue line 1004) along maxima points of the same side of the central FVD anomaly shown in FIG. 9B and discussed above.

As shown in FIG. 1, a tilt angle (TA) filter may be applied to the upward continued gravity data (block 124) to extract local details of the delineated lineaments from the first vertical derivatives (FVD) and horizontal gradient (HG) filters. As discussed herein, tilt angle (TA) may be calculated as the inverse tangent the ratio of first vertical derivative (FVD) and horizontal gradient (HG) of upward continued gravity anomaly, as shown in Equation 2:

$$\theta = \tan^{-1}\left(\frac{FVD}{HG}\right) \tag{2}$$

As tilt angle (TA) depends on the ratio of FVD and HG shown in Equation 2 and not on the individual magnitude of either of the two, TA may be the same when FVD and HG are simultaneously high or low. The magnitudes of FVD and HG depend linearly on density contrast, so the ratio in Equation 2 would cancel the dependency of tilt angle (TA) on density. As such, tilt angle (TA) is a meaningful attribute even for identifying faults that juxtapose low density contrasting geological formations.

Moreover, the magnitudes of FVD and HG are both relatively lower for a deeper contact, so their ratio is less sensitive to depth. Consequently, in some embodiments tilt angle (TA) is a suitable attribute for tracking details of both shallow and deep horizontal density variations. However, while this aspect may be advantageous, a depth focusing filter (for example, a band-pass filter) may optimally be applied prior to calculating tilt angle (TA) to minimize noise and the gravity responses from much shallower or much deeper lateral density variations than the main depth interval of interest. If these gravity responses are not filtered out before calculating tilt angle (TA), they may add strong signatures on the tilt angle (TA) and may be difficult to discriminate from those within the depth level of interest. By way of example, FIG. 11A depicts a 1 km upward continued Bouguer anomaly 1100 and FIG. 11B depicts the tilt angle attribute map 1100 of the Bouguer anomaly of FIG. 11A in accordance with an embodiment of the disclosure.

Next, as shown in FIG. 1, a normalized horizontal gradient (nHG) (block 128) is applied to the obtained upward continued gravity data to extract local details of already delineated lineaments from the horizontal gradient (HG) filter. As used herein, "normalized horizontal gradient" (nHG) is calculated as the tilt angle (TA) of the horizontal gradient (HG) and operated in a similar fashion as an AGC (Automatic Gain Control) operator applied to horizontal gradient (HG). The normalized horizontal gradient (nHG) amplifies the low amplitude horizontal gradients and makes it easier to track local changes in the lineaments derived from the horizontal gradient (HG) filter.

Figure 12A:
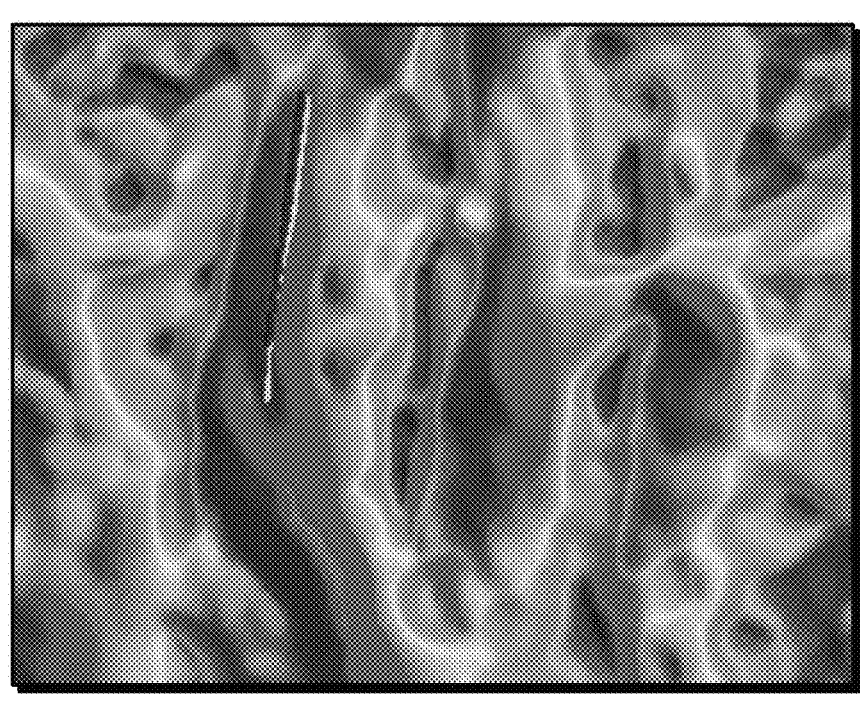
FIG. 12A depicts a 1 km upward continued Bouguer anomaly in accordance with an embodiment of the disclosure.
Figure 12B:
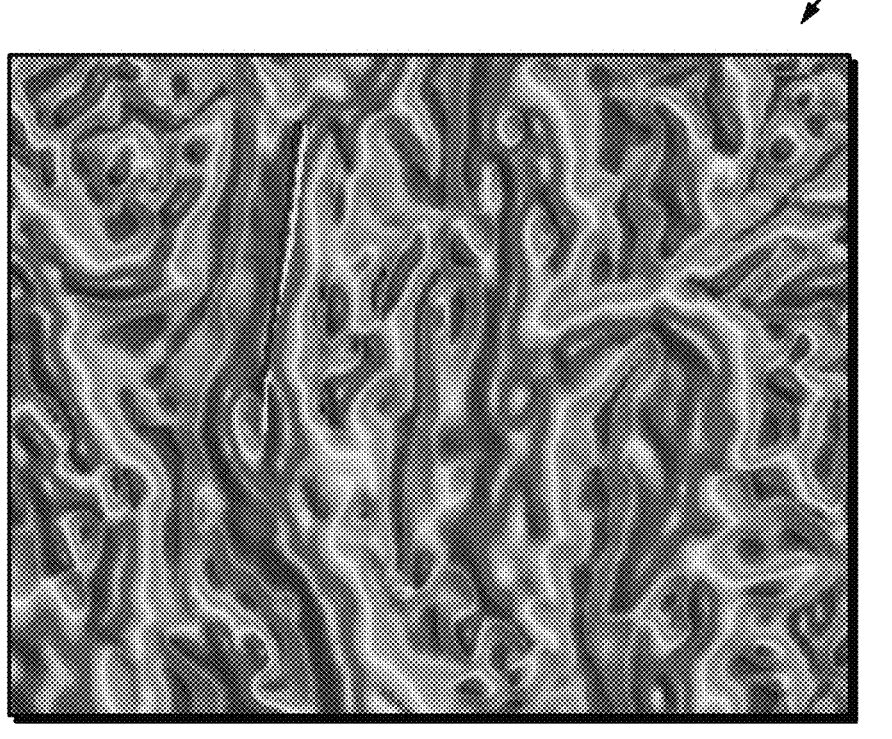
FIG. 12B depicts a normalized horizontal gradient (nHG) attribute map of the Bouguer anomaly of FIG. 12A in accordance with an embodiment of the disclosure.

By way of example, FIG. 12A depicts a 1 km upward continued Bouguer anomaly 1200, and FIG. 12B depicts a normalized horizontal gradient (nHG) attribute map 1202 of the Bouguer anomaly of FIG. 12B in accordance with an embodiment of the disclosure. As shown in FIG. 12B, the normalized horizontal gradient (nHG) attribute map shows a signature of a different fault at the southern end of the horizontal gradient (HG) lineament that is not clear on the FVD attribute map depicted in FIG. 9B. Thus, the advantages of using multi-attribute integrated structural framework interpretation may be understood from the sequence of filters depicted in FIGS. 9A-12B and discussed above.

After processing the gravity data (block 104), a structural framework based on the gravity data may be determined (block 106). The determination of the structural framework based on the gravity data may include an integrated analysis of gravity attribute maps (block 132), identification of basement lineaments (block 134), and a determination of statistical fault orientation (block 136).

The integrated analysis of the gravity attribute maps (block 132) is performed on the attribute maps derived in steps 120-128, as discussed above and shown in FIGS. 9A-12B. As discussed herein, these attribute maps represent color coded, mapped, and spatially commonly referenced gravity data sets. The integrated analysis may be performed by observing the magnitude variation of each attribute over the same displayed area, alternating among the attributes, and eventually allowing variable transparency so that two or more attributes can be visually blended.

By way of example, in some embodiments the integrated analysis of the gravity attribute maps may start by initiating a lineament on the horizontal gradient (HG) map of the upward continued (UC) gravity data. Next, the first vertical derivative (FVD) of the upward continuation (UC) gravity data is observed along this lineament, and the initial lineament is adjusted if needed. Similarly, the normalized horizontal gradient (nHG) and tilt angle (TA) attributes may be analyzed and the lineament gradually adjusted in accordance with the local magnitude distribution in each attribute map and specific interpretation principles outlined in the discussion of these techniques supra. Other lineaments may be interpreted in a similar manner and, while progressing in delineating other lineaments, the previous outlined ones can also be updated in accordance with the improvement in understanding the regional and local tectonic mechanism that may lead to currently analyzed attributes.

Figure 13A:
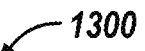
FIGS. 13A-13D depict a set of interpreted gravity lineaments overlaid on example main gravity attributes in accordance with an embodiment of the disclosure.
Figure 13A:
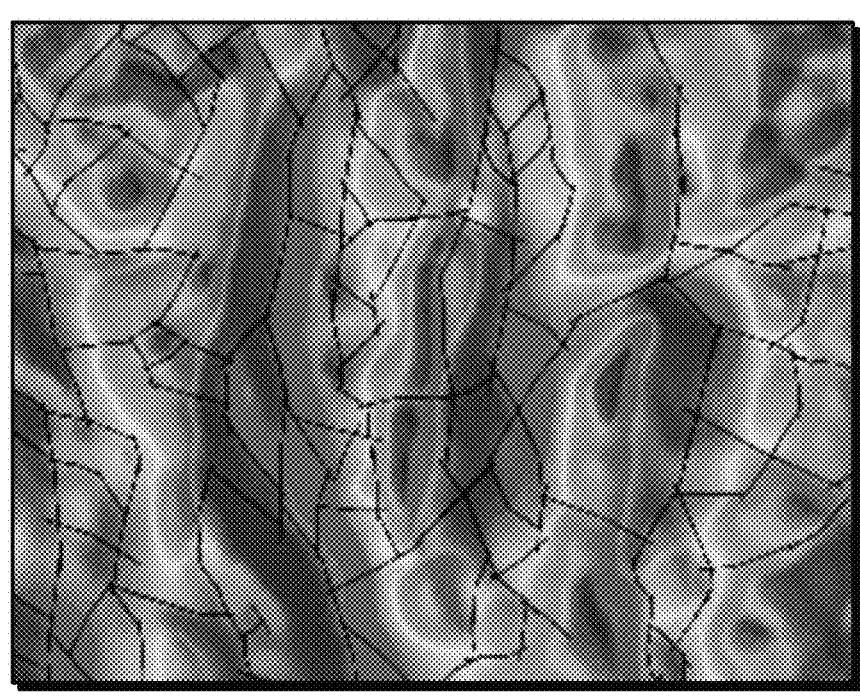
Figure 13B:
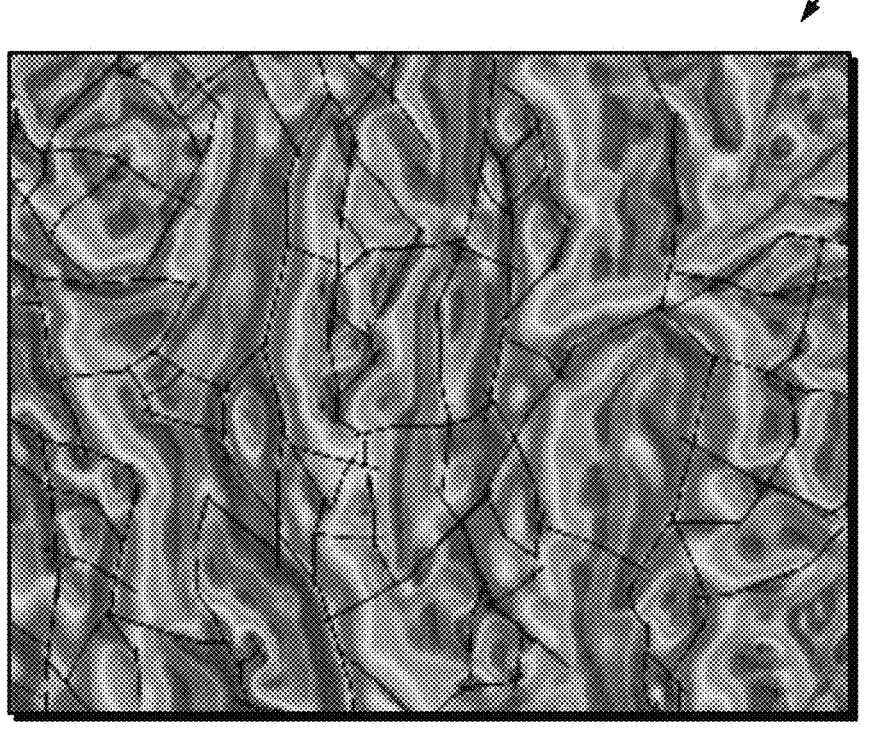
Figure 13C:
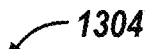
Figure 13C:
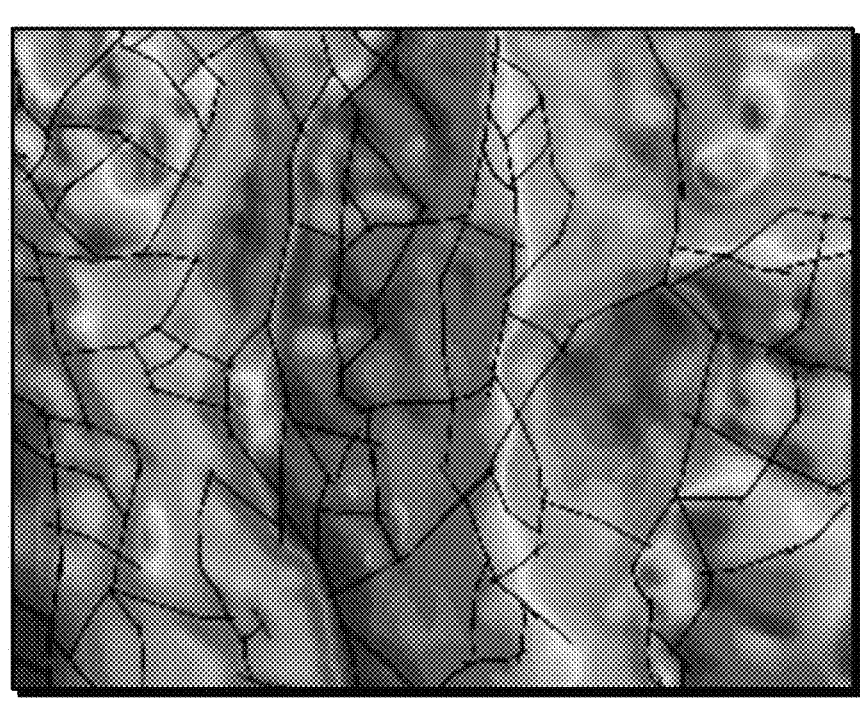
Figure 13D:
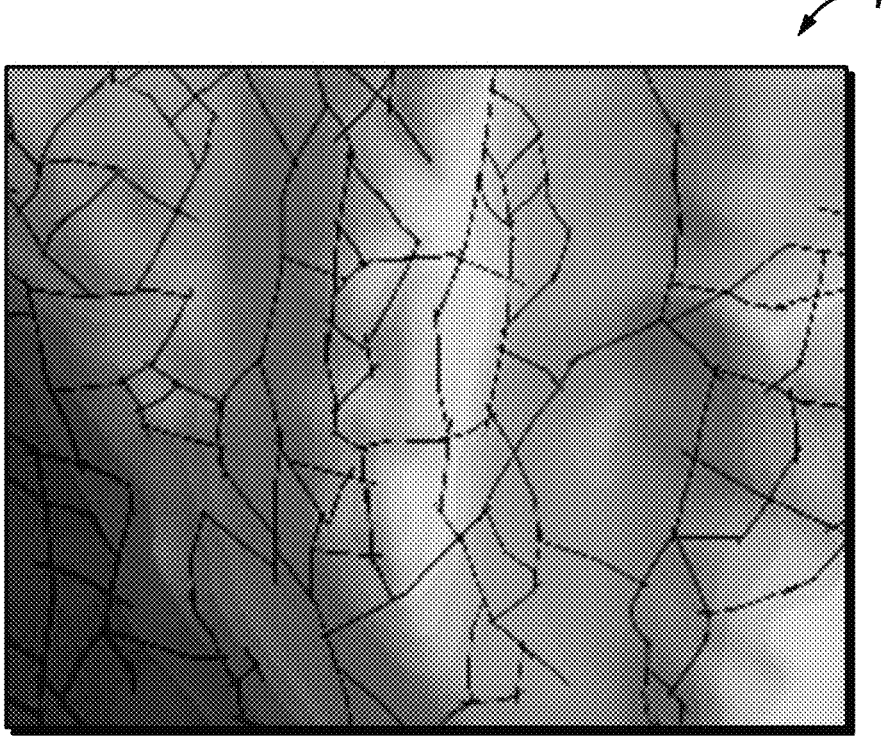

As shown in FIG. 1, basement lineaments may be identified (block 226). The interpreted lineaments are combined into a unique set and in the formats for inclusion in the modelling of stress perturbation analysis. The set of interpreted lineaments defines the structural framework based on gravity data and reveals the patterns in changes of rock densities as an effect of evolution in time and space of in-situ stress regime. By way of example, FIGS. 13A-13D depict a set of interpreted gravity lineaments overlaid on example main gravity attributes in accordance with an embodiment of the disclosure. FIG. 13A depicts the horizontal gradient (HG) attribute map 1300 of 1 km upward continuation (UC) gravity data with the gravity lineaments (in black lines). FIG. 13B depicts the normalized horizontal gradient (nHG) attribute map 1302 of 1 km upward continuation (UC) gravity data with the gravity lineaments (in black lines). FIG. 13C depicts the first vertical derivative attribute map 1304 of 1 km upward continuation (UC) gravity data with the gravity lineaments (in black lines). Finally, FIG. 13D depicts the of 1 km upward continuation (UC) gravity data 1306 with the gravity lineaments.

In some embodiments, magnetic data may be obtained for a region of interest. In such embodiment, gravity lineaments may be compared with magnetic lineaments and combined based on a consideration of the differences of these lineaments. Gravity lineaments are signatures of density variations, while magnetic lineaments are signatures of magnetic susceptibility variations. Consequently, magnetic lineaments are more significantly tied to the basement rocks and intra-sedimentary volcanics (where present), and gravity lineaments may align more significantly with intra-sedimentary structural changes. This difference may be used to classify some of the gravity lineaments as non-basement related and to assign these gravity lineaments higher weights in stress perturbation modelling.

Figure 14A:
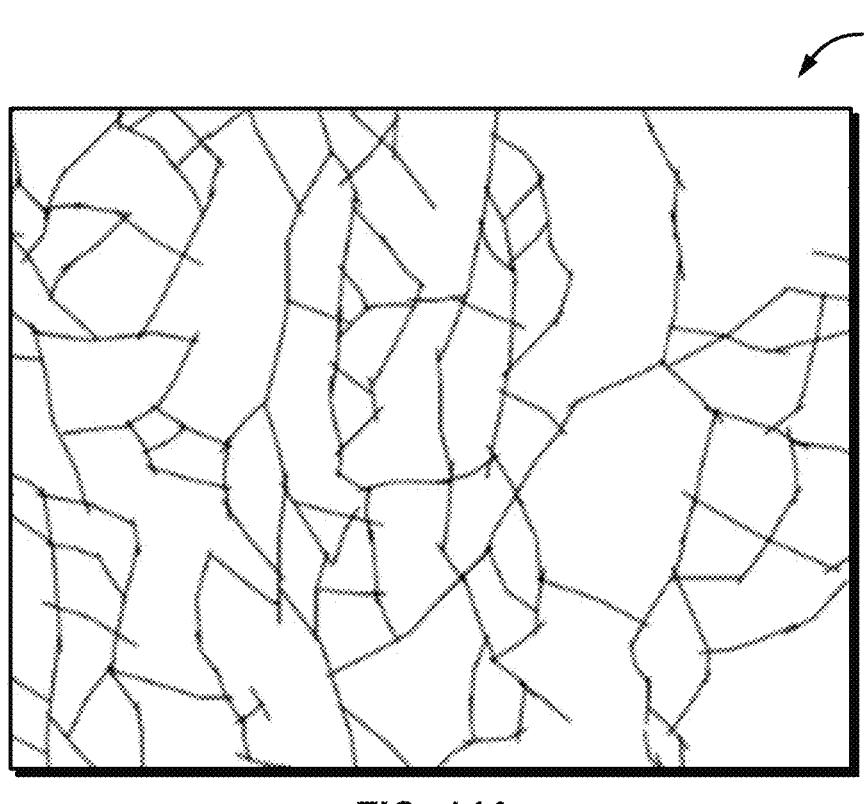
FIG. 14A depicts interpreted gravity lineaments in accordance with an embodiment of the disclosure.
Figure 14B:
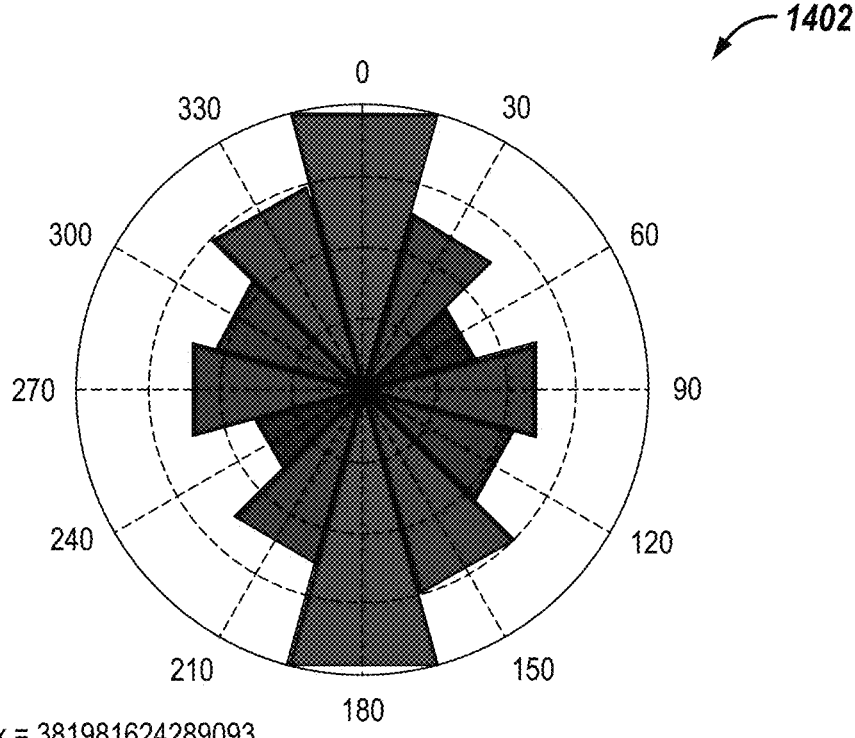
FIG. 14B depicts a corresponding rose diagram 1402 generated from the gravity lineaments of FIG. 14A in accordance with an embodiment of the disclosure.

Next, as shown in FIG. 1, a statistical fault orientation may be determined (block 136). The orientations (azimuths) and lengths of lineaments included in the interpreted gravity structural framework may statistically analyzed. In some embodiments, a rose diagram may be generated to outline the most significant directions of natural stress mechanisms that acted in time within the region of interest. By way of example, FIG. 14A depicts interpreted gravity lineaments 1400, and FIG. 14B depicts a corresponding rose diagram 1402 generated from the gravity lineaments of FIG. 14A.

Finally, as shown in FIG. 1, the process 100 includes determination of an in-situ stress perturbation model (block 108). After lineaments are identified from potential fields data (that is gravity and in some embodiments magnetic), the lineaments may be superimposed with the maximum horizontal stress directed identified at the well level to evaluate the changes in direction due to these lineaments. The determination of the in-situ stress perturbation model may include determination of basement lineaments (138), finite element geomechanical simulation (140), and perturbation of the stress state (142).

Figure 15:
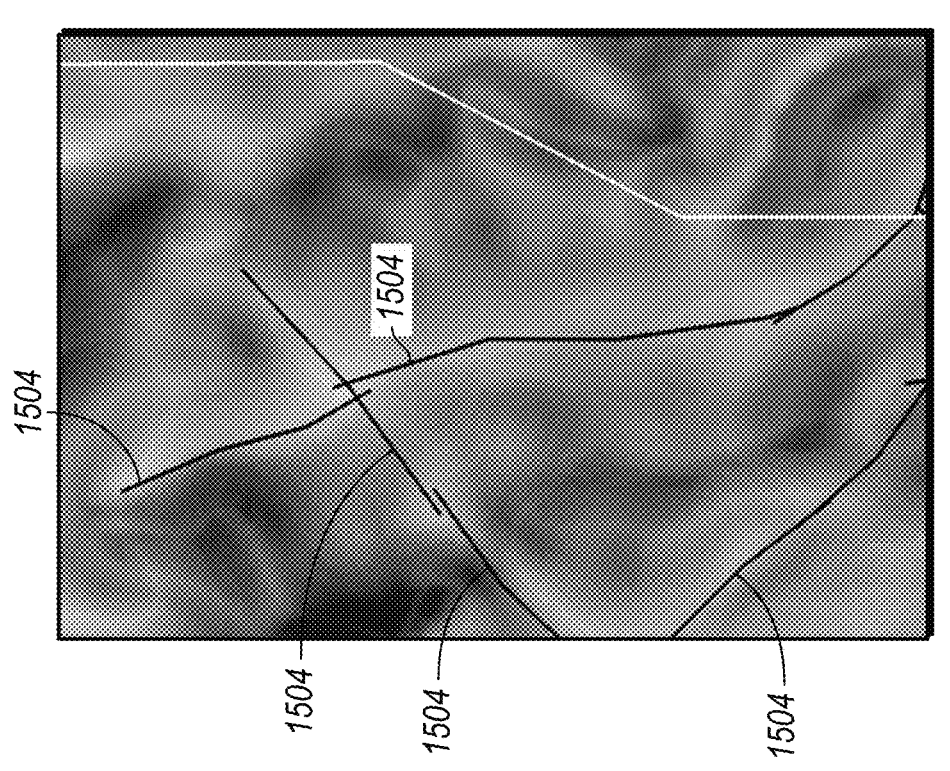
FIG. 15 depicts lineaments extracted from potential fields data in a region of interest in accordance with an embodiment of the disclosure.

In the determination of the in-situ stress perturbation model, lineaments may be determined (block 138) from the gravity and magnetic data and used to model discontinuities or faults with the structural framework. This enables the introduction of mechanical properties into the discontinuities or fault properties, thus mechanically discretizing the lineaments into the in-situ stress perturbation model. By way of example, FIG. 15 depicts lineaments 1500 extracted from potential fields data in a region of interest in accordance with an embodiment of the disclosure.

Figure 16:
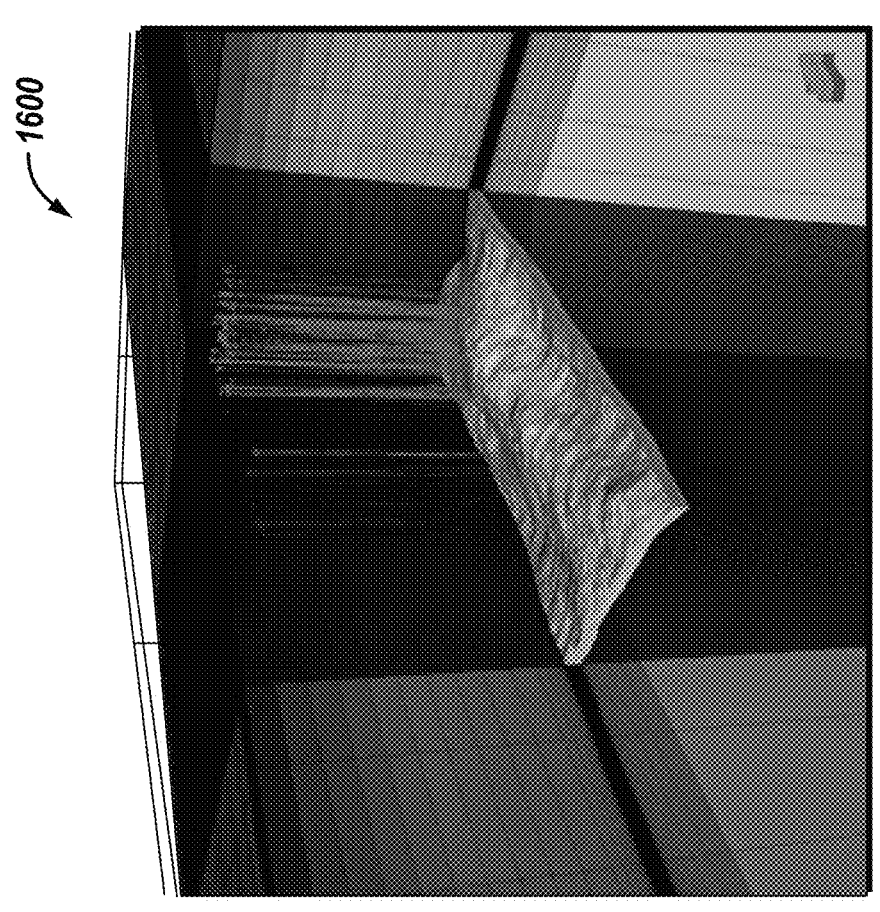
FIG. 16 depicts the gridding of a 3D mechanical earth model in accordance with an embodiment of the disclosure.

Once the lineaments are modeled into the structural framework, a finite element geomechanical simulation may be performed (block 140) to construct a 3D mechanical earth model. In some embodiments, the 3D mechanical earth model may be constructed using geomechanical simulation software such as VISAGE™ manufactured by Schlumberger Limited of Houston, Texas, USA. In the construction, the compliance between the normal and shear stiffness mechanical properties may be defined as discontinuity properties in order to reproduce or capture the observed data from in-situ stress indicator steps. By way of example, FIG. 16 depicts the gridding of a 3D mechanical earth model 1600 in accordance with an embodiment of the disclosure.

Figure 17B:
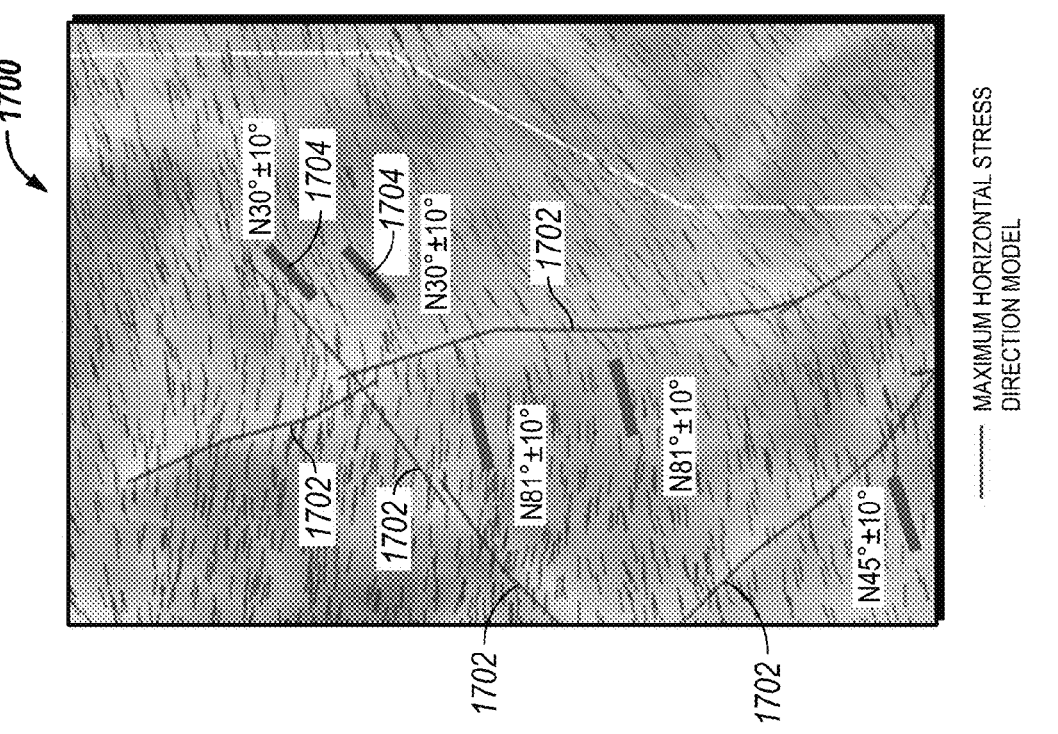
FIG. 17B depicts an integrated maximum horizontal stress direction model in a region of interest in accordance with an embodiment of the disclosure.
Figure 17A:
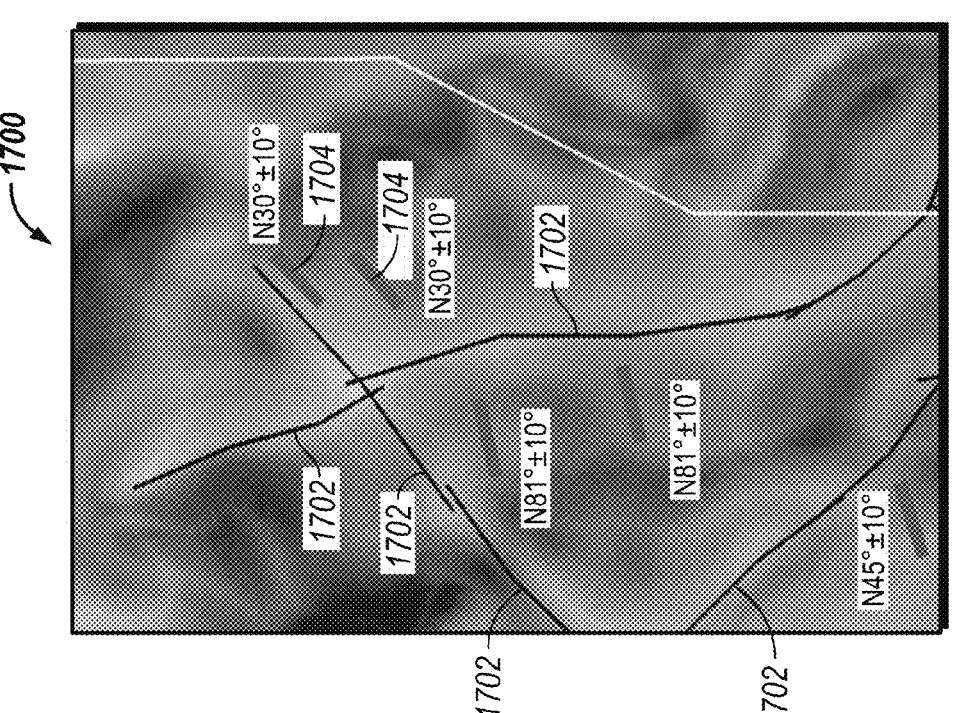
FIG. 17A depicts deep structural lineaments extracted in a region of interest in accordance with an embodiment of the disclosure.

Next, the perturbed stress state may be determined (block 142). The variation of the in-situ stress direction may be reflected in the stress tensor direction, by having the maximum horizontal stress tensor as the indicator and reflecting the observed data (stress indicators). By way of example, FIG. 17A shows a region of interest 1700 and depicts the deep structural lineaments 1702 as discussed supra in accordance with an embodiment of the disclosure. FIG. 17A also depicts maximum horizontal stress direction 1704 in the region of interest 1700 for evaluation with the deep structural lineaments 1702. FIG. 17B depicts the integrated maximum horizontal stress direction model 1706.

Figure 18:
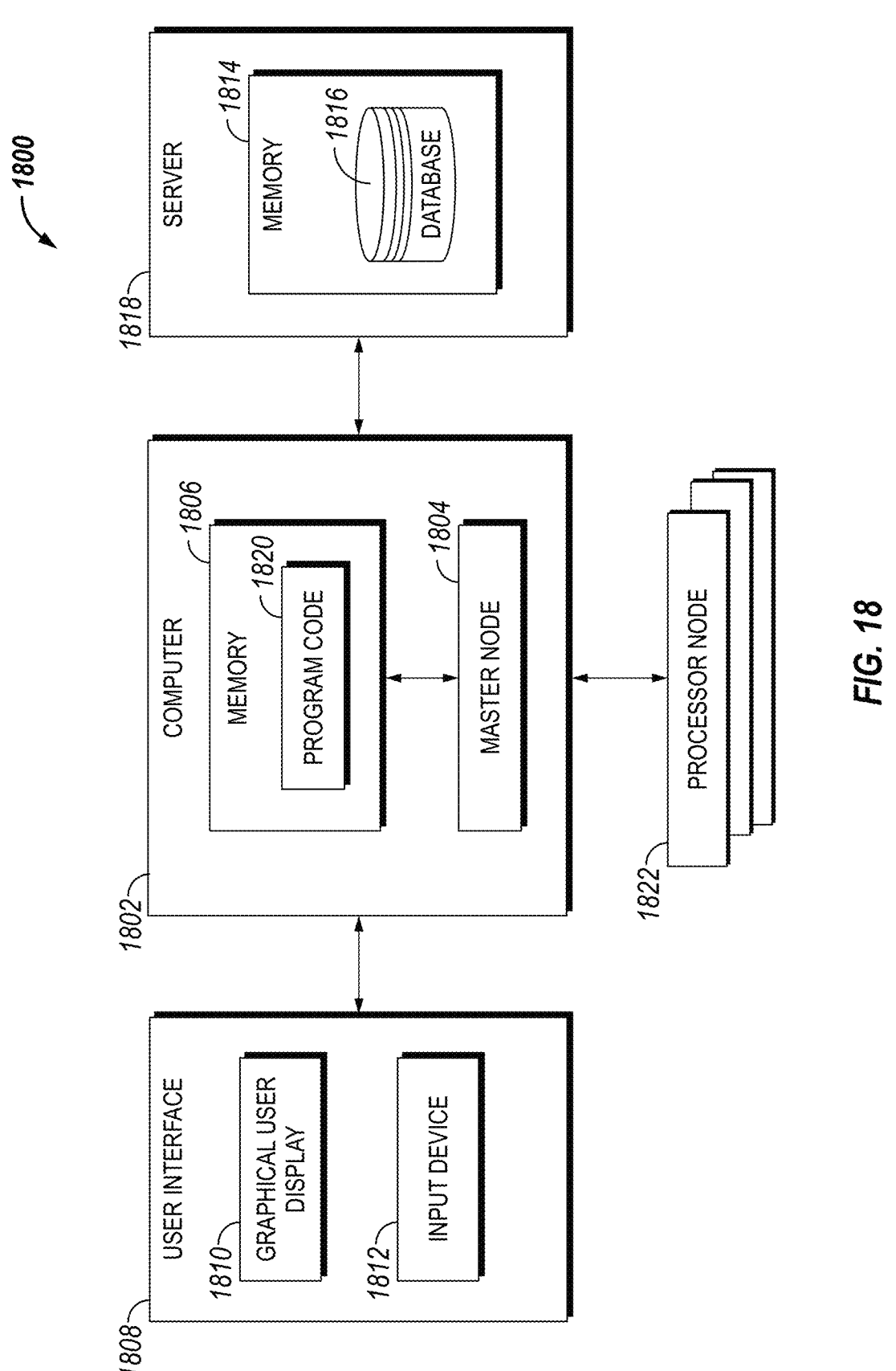
FIG. 18 is a block diagram of a data processing system in accordance with an embodiment of the disclosure.

FIG. 18 depicts a data processing system 1800 that includes a computer 1802 having a master node processor 1804 and memory 1806 coupled to the processor 1804 to store operating instructions, control information and database records therein in accordance with an embodiment of the disclosure. The data processing system 1800 may be a multicore processor with nodes such as those from Intel Corporation or Advanced Micro Devices (AMD), or an HPC Linux cluster computer. The data processing system 1800 may also be a mainframe computer of any conventional type of suitable processing capacity such as those available from International Business Machines (IBM) of Armonk, N.Y., or other source. The data processing system 1800 may in cases also be a computer of any conventional type of suitable processing capacity, such as a personal computer, laptop computer, or any other suitable processing apparatus. It should thus be understood that a number of commercially available data processing systems and types of computers may be used for this purpose.

The computer 1802 is accessible to operators or users through user interface 1808 and are available for displaying output data or records of processing results obtained according to the present disclosure with an output graphic user display 1810. The output display 1810 includes components such as a printer and an output display screen capable of providing printed output information or visible displays in the form of graphs, data sheets, graphical images, data plots and the like as output records or images.

The user interface 1808 of computer 1802 also includes a suitable user input device or input/output control unit 1812 to provide a user access to control or access information and database records and operate the computer 1802. Data processing system 1800 further includes a database of data stored in computer memory, which may be internal memory 1806, or an external, networked, or non-networked memory as indicated at 1814 in an associated database 1816 in a server 1818.

The data processing system 1800 includes executable code 1820 stored in non-transitory memory 224 of the computer 1802. The executable code 1820 according to the present disclosure is in the form of computer operable instructions causing the data processor 1804 to determine a structural model, process gravity data, and determine a structural framework based on the processed gravity data. Moreover, the computer operable instructions of the executable code 1820 may determine an in-situ stress perturbation model according to the techniques described herein.

It should be noted that executable code 1820 may be in the form of microcode, programs, routines, or symbolic computer operable languages capable of providing a specific set of ordered operations controlling the functioning of the data processing system 1800 and direct its operation. The instructions of executable code 1820 may be stored in memory 1806 of the data processing system 1800, or on computer diskette, magnetic tape, conventional hard disk drive, electronic read-only memory, optical storage device, or other appropriate data storage device having a non-transitory computer readable storage medium stored thereon. Executable code 1820 may also be contained on a data storage device such as server 1818 as a non-transitory computer readable storage medium, as shown.

The data processing system 1800 may be include a single CPU, or a computer cluster as shown in FIG. 18, including computer memory and other hardware to make it possible to manipulate data and obtain output data from input data. A cluster is a collection of computers, referred to as nodes, connected via a network. A cluster may have one or two head nodes or master nodes 1804 used to synchronize the activities of the other nodes, referred to as processing nodes 1822. The processing nodes 1822 each execute the same computer program and work independently on different segments of the grid which represents the reservoir.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method of determining in-situ stress perturbation using potential fields data to identify lineaments in a subsurface geological structure having a subsurface hydrocarbon reservoir, the method comprising:

determining an in-situ stress direction indicator in the subsurface geological structure;

obtaining Bouguer gravity data in the subsurface geological structure;

processing the Bouguer gravity data to determine one or more attributes, the one or more attributes comprising an upward continuation, a spatial band-pass filter, a first vertical derivative, a horizontal gradient filter, a tilt angle filter, and a normalized horizontal gradient filter;

generating one or more respective attribute maps based on the one or more attributes, each of the one or more attribute maps identifying a value of the attribute in the subsurface geological structure;

identifying a lineament in the subsurface geological structure from the one or more attribute maps; and combining the lineament and the in-situ stress direction indicator in a three-dimensional (3D) mechanical earth model to determine the in-situ stress perturbation in the subsurface geological structure.

2. The method of claim 1, wherein determining an in-situ stress direction indicator in the subsurface geological structure comprising determining the in-situ stress direction indicator from a sonic or acoustic borehole image.

3. The method of claim 1, wherein determining an in-situ stress direction indicator in the subsurface geological structure comprising determining the in-situ stress direction indicator using azimuthal shear anisotropy analysis or multi-arm caliper analysis.

4. The method of claim 1, wherein combining the lineament and the in-situ stress direction indicator in a three-dimensional (3D) mechanical earth model comprising discretizing the lineament as a discontinuity.

5. The method of claim 1, wherein the lineament is a first lineament, the method comprising obtaining magnetic data and determining a second lineament from the magnetic data.

6. The method of claim 5, comprising combining the first lineament and the second lineament into a set of lineaments.

7. The method of claim 1, comprising identifying a location in the subsurface geological structure for a well using the in-situ stress perturbation.

8. The method of claim 7, comprising drilling a well in the subsurface geological structure at the identified location.

9. A non-transitory computer-readable storage medium having executable code stored thereon for determining in-situ stress perturbation using potential fields data to identify lineaments in a subsurface geological structure having a subsurface hydrocarbon reservoir, the executable code comprising a set of instructions that causes a processor to perform operations comprising:

determining an in-situ stress direction indicator in the subsurface geological structure;

obtaining Bouguer gravity data in the subsurface geological structure;

processing the Bouguer gravity data to determine one or more attributes, the one or more attributes comprising an upward continuation, a spatial band-pass filter, a first vertical derivative, a horizontal gradient filter, a tilt angle filter, and a normalized horizontal gradient filter;

generating one or more respective attribute maps based on the one or more attributes, each of the one or more attribute maps identifying a value of the attribute in the subsurface geological structure;

identifying a lineament in the subsurface geological structure from the one or more attribute maps; and combining the lineament and the in-situ stress direction indicator in a three-dimensional (3D) mechanical earth model to determine the in-situ stress perturbation in the subsurface geological structure.

10. The non-transitory computer-readable storage medium of claim 9, wherein determining an in-situ stress direction indicator in the subsurface geological structure comprising determining the in-situ stress direction indicator from a sonic or acoustic borehole image.

11. The non-transitory computer-readable storage medium of claim 9, wherein determining an in-situ stress direction indicator in the subsurface geological structure comprising determining the in-situ stress direction indicator using azimuthal shear anisotropy analysis or multi-arm caliper analysis.

12. The non-transitory computer-readable storage medium of claim 9, wherein combining the lineament and the in-situ stress direction indicator in a three-dimensional (3D) mechanical earth model comprising discretizing the lineament as a discontinuity.

13. The non-transitory computer-readable storage medium of claim 9, wherein the lineament is a first lineament, the method comprising obtaining magnetic data and determining a second lineament from the magnetic data.

14. The non-transitory computer-readable storage medium of claim 13, the operations comprising combining the first lineament and the second lineament into a set of lineaments.

15. The non-transitory computer-readable storage medium of claim 9, the operations comprising identifying a location in the subsurface geological structure for a well using the in-situ stress perturbation.

16. The non-transitory computer-readable storage medium of claim 15, the operations comprising controlling the drilling of a well in the subsurface geological structure at the identified location.

17. A system for determining in-situ stress perturbation using potential fields data to identify lineaments in a subsurface geological structure having a subsurface hydrocarbon reservoir, comprising:

a processor;

a non-transitory computer-readable memory accessible by the processor and having executable code stored thereon, the executable code comprising a set of instructions that causes the processor to perform operations comprising:

determining an in-situ stress direction indicator in the subsurface geological structure;

obtaining Bouguer gravity data in the subsurface geological structure;

processing the Bouguer gravity data to determine one or more attributes, the one or more attributes comprising an upward continuation, a spatial band-pass filter, a first vertical derivative, a horizontal gradient filter, a tilt angle filter, and a normalized horizontal gradient filter;

generating one or more respective attribute maps based on the one or more attributes, each of the one or more attribute maps identifying a value of the attribute in the subsurface geological structure;

identifying a lineament in the subsurface geological structure from the one or more attribute maps; and combining the lineament and the in-situ stress direction indicator in a three-dimensional (3D) mechanical earth model to determine the in-situ stress perturbation in the subsurface geological structure.

18. The system of claim 17, wherein determining an in-situ stress direction indicator in the subsurface geological structure comprising determining the in-situ stress direction indicator from a sonic or acoustic borehole image.

19. The system of claim 17, wherein determining an in-situ stress direction indicator in the subsurface geological structure comprising determining the in-situ stress direction indicator using azimuthal shear anisotropy analysis or multi-arm caliper analysis.

20. The system of claim 17, wherein combining the lineament and the in-situ stress direction indicator in a three-dimensional (3D) mechanical earth model comprising discretizing the lineament as a discontinuity.

21. The system of claim 17, wherein the lineament is a first lineament, the method comprising obtaining magnetic data and determining a second lineament from the magnetic data.

22. The system of claim 21, the operations comprising combining the first lineament and the second lineament into a set of lineaments.

23. The system of claim 17, the operations comprising identifying a location in the subsurface geological structure for a well using the in-situ stress perturbation.

24. The system of claim 23, the operations comprising controlling the drilling of a well in the subsurface geological structure at the identified location.

* * * * *